US006959122B2

United States Patent
McIntyre

(10) Patent No.: US 6,959,122 B2
(45) Date of Patent: Oct. 25, 2005

(54) METHOD AND SYSTEM FOR ASSISTING IN THE RECONSTRUCTION OF AN IMAGE DATABASE OVER A COMMUNICATION NETWORK

(75) Inventor: Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 607 days.

(21) Appl. No.: 09/891,546

(22) Filed: Jun. 26, 2001

(65) Prior Publication Data

US 2002/0196986 A1 Dec. 26, 2002

(51) Int. Cl.[7] .............................................. G06K 9/60
(52) U.S. Cl. ...................... 382/305; 707/202; 707/204
(58) Field of Search .............................. 382/305, 158, 382/274, 299; 707/202, 204; 709/203, 217

(56) References Cited

U.S. PATENT DOCUMENTS

| 5,153,936 | A | * | 10/1992 | Morris et al. ............... 345/428 |
|---|---|---|---|---|
| 5,164,831 | A | | 11/1992 | Kuchta et al. ............ 348/231.7 |
| 5,737,491 | A | | 4/1998 | Allen et al. .................. 704/270 |
| 5,761,404 | A | * | 6/1998 | Murakami et al. ............. 714/15 |
| 6,058,417 | A | * | 5/2000 | Hess et al. ................... 709/219 |
| 6,137,914 | A | * | 10/2000 | Ligtenberg et al. .......... 382/240 |
| 6,460,055 | B1 | * | 10/2002 | Midgley et al. ............. 707/204 |
| 6,505,216 | B1 | * | 1/2003 | Schutzman et al. ......... 707/204 |
| 6,522,418 | B2 | * | 2/2003 | Yokomizo et al. .......... 358/1.15 |
| 2001/0003180 | A1 | * | 6/2001 | Sakai et al. .................... 705/40 |

\* cited by examiner

Primary Examiner—Bhavesh M. Mehta
Assistant Examiner—Dennis Rosario
(74) Attorney, Agent, or Firm—Frank Pincelli

(57) ABSTRACT

A method and system for providing assistance in recreating a digital image file on a user computer from information obtained over a communication network retained at a remote location with respect to the image file. Images store on a user computer are so as to obtain a low resolution digital image files of high resolution digital image files stored on the storage device along with storage parameters of the high resolutions digital image files. This information is used in the reconstruction of the user image data base.

6 Claims, 21 Drawing Sheets

METHOD AND SYSTEM FOR ASSISTING IN THE RECONSTRUCTION OF AN IMAGE DATABASE OVER A COMMUNICATION NETWORK

CROSS REFERENCE TO RELATED APPLICATIONS

U.S. Ser. No. 09/892,042, filed Jun. 26, 2001, entitled "METHOD AND SYSTEM FOR MANAGING IMAGES OVER A COMMUNICATION NETWORK";

U.S. Ser. No. 09/891,751, filed Jun. 26, 2001, entitled "A METHOD AND SYSTEM FOR MANAGING IMAGES OVER A COMMUNICATION NETWORK";

U.S. Ser. No. 09/891,474, filed Jun. 26, 2001, entitled "SYSTEM AND METHOD FOR MANAGING IMAGES OVER A COMMUNICATION NETWORK";

U.S. Ser. No. 09/892,044, filed Jun. 26, 2001, entitled "A SYSTEM AND METHOD FOR MANAGING IMAGES OVER A COMMUNICATION NETWORK";

U.S. Ser. No. 09/892,043, filed Jun. 26, 2001, entitled "METHOD AND SYSTEM FOR MANAGING IMAGES OVER A COMMUNICATION NETWORK USING USER PROVIDED INSTRUCTIONS";

U.S. Ser. No. 09/891,543, filed Jun. 26, 2001, entitled "A METHOD FOR MANAGING IMAGES OVER A COMMUNICATION NETWORK";

U.S. Ser. No. 09/891,562, filed Jun. 26, 2001, entitled "AN ELECTRONIC CAMERA AND SYSTEM FOR TRANSMITTING DIGITAL OVER A COMMUNICATION NETWORK";

FIELD OF THE INVENTION

The present invention is directed to automatically managing digital image files over a communication network.

BACKGROUND OF THE INVENTION

Currently, there are many providers of online imaging services. One such example is the Kodak PhotoNet Online service offered by the Eastman Kodak Company. In such a system, a user must select a photofinishing order option on the film processing envelope that includes the digitization and uploading of the high resolution film images to a secure website where they are stored. Upon receiving and paying for the printed photofinishing order, the user receives a coupon that includes information for accessing the digital images on the website. Subsequently, the user must return to their home and using a computer with a conventional Internet browser must navigate to the website indicated by the coupon. Upon arrival at the website and entry of the supplied information, the user finally is able to view their digital images.

At this point, the user can electronically share their images with third parties. Depending on the skill of the user, they can choose to send digitized images as image file attachments via electronic mail. This entails knowing the electronic address of those third parties which is usually stored and managed by a different software application on the user's computer. Furthermore, image file attachments can cause an electronic mailbox to exceed a predetermined storage capacity especially if the user desires to share several images.

Another method of electronically sharing that attempts to solve the dilemma of sharing several images involves, sending an electronic link embedded in an electronic mail message that when clicked by the receiver, causes the receiving computer to locate and access the website containing the entire digitized order. A problem with this method is that the receiver must have an Internet browser that is compatible with the electronic mail application to automatically launch the internet browser to the site of the digitized images. Furthermore, the receiver must enter information to view the images at the site. Access must also be given for each and every film order processed and uploaded.

If the user desires to retrieve a copy of the digitized image for use on their own computer, they can encounter additional problems. For example, the user must follow several time consuming steps that often incur an additional charge or fee beyond the initial photofinishing order fee, to retrieve the high resolution image file that is stored at the online photoservice provider. In other cases some photoservice providers do not allow the user to download the high resolution image file at all.

Another common service provided by online photoservice providers is the ability for a user to use a computer to upload a digitized image already in the possession of the user such as image files created by a scanner, a digital camera, or a digitized film product such as the PictureCD™ produced by the Eastman Kodak Company. These online photoservice providers store high resolution image files uploaded by users typically for producing printed images. Electronically sharing of these images is similar to those being placed at a website automatically by a photofinisher and similar problems are encountered by a user using such a service. The user must, for example, take the time to upload each and every image that he or she wishes to print or electronically share.

Another disadvantage with prior art systems is that the owner of the image often loses control of the high resolution image as this is typically stored at the service provider. Additionally, it is also undesirable to keep an entire copy of the high resolution images at a service provider as charges are often associated with such storage. In addition if the service provider loses the image it can be very difficult to regain the original high resolution image. It is therefore desirable to be able to restore the high resolution images at the user computer.

In situations where the high resolution images are stored on user computer memory storage devices, such as a hard drive, there exists the possibility of a memory failure with respect to the stored images. Thus, there is also a need to be able to provide a system to assist in reestablishing the high resolution images at the user computer with little or no cost to the user in the event of a failure of a user memory storage device.

SUMMARY OF THE INVENTION

In accordance with one aspect of the present invention there is provided a method for providing assistance in recreating a digital image file on a user computer from information obtained over a communication network retained at a remote location with respect to the image file, comprising:

analyzing a user storage device in a user computer over the communication network so as to obtain low resolution digital image files of high resolution digital image files stored on the storage device and storage parameters of the high resolutions digital image files;

storing the low resolution digital image files and the storage parameters at a remote server of a provider; and transmitting the image storage parameters over a communication network to the user computer so as to assist in reconstructing the high resolution digital image files in the user storage device.

In accordance with another aspect of the present invention there is provided a system for providing assistance in recreating a digital image file on a user computer from information obtained over a communication network retained at a remote location with respect to the image file, comprising:

a provider having a provider computer that analyzes a user storage device in the user computer over the communication network so as to obtain low resolution digital image files of high resolution digital image files stored on the storage device and storage parameters of the high resolutions digital image files; the provider storing the low resolution digital image files and the storage parameters at a remote server of a provider; and the provider transmitting the image storage parameters over a communication network to the user computer so as to assist in reconstructing the high resolution digital image files in the user storage device.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 10a is partial view of a display screen illustrating an image from which an image content identifier is obtained;

FIG. 10b is an enlarged view of the image content identifier of FIG. 10a;

DETAILED DESCRIPTION OF THE INVENTION

Figure 1:
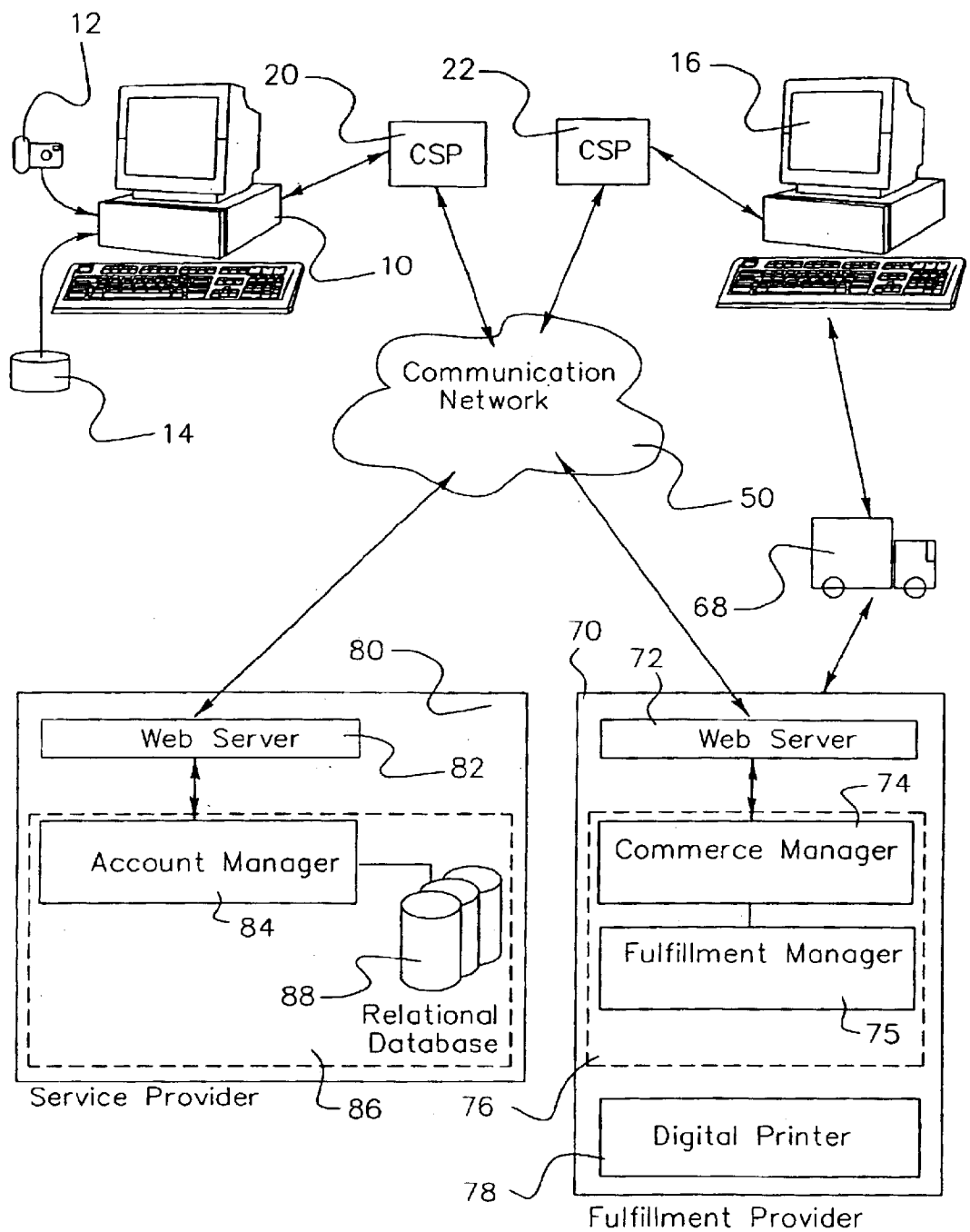
FIG. 1 is a schematic diagram of a system made in accordance with the present invention showing the relationship of a user desiring to share digital images with a third party as permitted by a service provider.

Referring to FIG. 1, there is illustrated a system 18 made in accordance with the present invention. System 18 includes a user computer 10 operably connected through a communication service provider (CSP) 20 and a communication network 50 (such as the Internet) to a service provider 80. Also included in system 18 is a third party computer 16 operably connected to the communication network 50 and service provider 80 via a CSP 22. User computer 10 is also operably connected to an electronic camera 12 and a storage drive 14. The electronic camera 12 can be a digital still camera such as the Kodak DC280 digital camera manufactured by the Eastman Kodak Company or it can be a digital motion camera such as the Kodak MC3 portable multimedia device which records motion and sound in addition to still capture and sound reproduction. For the simplification of discussion, digital images originally created by either digital still, digital motion electronic cameras, or by scanning film, will be referred to as high resolution image files. Likewise, low resolution files are formed from the high resolution image files by sub-sampling, which in the case of digital still image files, involves reducing the number of image pixels and effectively lowering the resolution. Such low-resolution, or "thumbnail" size images, can be created as described in commonly-assigned U.S. Pat. No. 5,164,831 "ELECTRONIC STILL CAMERA PROVIDING MULTI-FORMAT STORAGE OF FULL AND REDUCED RESOLUTION IMAGES" to Kuchta, et. al., the disclosure of which is herein incorporated by reference. In the case of digital motion files, low resolution files can include the discarding of frames and/or pixels within a frame. Such techniques are well known in the art and facilitate the transportation of images across any communication network 50 such as the Internet.

In the particular embodiment illustrated, the storage drive 14 is illustrated as being removable. However the present invention is not limited to such a configuration. For example, the storage drive 14 can be an integral part of user computer 10 and can use removable storage media (not shown). The electronic camera 12 can connect to the user computer 10 via a cable employing a common interface such as a Universal Serial Bus (USB) interface. Alternatively, electronic camera 12 can connect to the user computer 10 in a wireless mode employing any number of conventional interfaces such as the radio frequency standard commonly described by Bluetooth™ Specification V1.0 or Wireless Personal Area Network IEEE Standard 802.15. Likewise, removable storage drive 14 is operably connected to user computer 10 and permits the storage of high resolution image files such as digital still or digital motion images and associated metadata that can, for example, further include audio information. For the purposes of the present invention, an image media file includes a digital image file (high or low resolution) and can also include additional data such as associated audio or metadata. The user selects the location for the storage of the high resolution image media files either internally to the user computer 10 or on removable storage drive 14, such as computer disc, CD, etc.. In general, high resolution image media files can be arranged in a user storage file such as a database.

The user computer 10 is provided with appropriate software for allowing controlled access to a high resolution image media collection, such as a database, stored on memory storage device 14. The high resolution image media collection comprises at least one high resolution image media file and as previously discussed can include associated digital data. A low resolution copy of each high resolution digital image file along with any associated meta data/information (the combination of both files hereinafter referred to as the user low resolution image collection) is electronically sent to the service provider 80 for storage at the service provider 80 and is associated with the user. One way in which an image can be associated with a user is the addition of metadata to the image media files(s) that reflects a specific user identifier such as a user account number, a user provided identifier with any combination of alphanumeric characters, or any other construct in the form of metadata. Another form of association with the user can be accomplished by creating a storage system that allocates file storage based on a user identifier such as a relational database. This association creates a low resolution user image collection of the digital image files at the service provider 80. While the digital image files and associated data files can be forwarded by the user, these files can be automatically retrieved by the service provider 80. For example, the user has a database identified for access by the service provider 80. The service provider 80 can automatically, on a routine schedule, determine if the user computer 10 is available over the communication network 50. If the user computer 10 is available for communication, the service provider 80 will then automatically review the database on the user computer 10 where the high resolution media files are stored to determine if any new digital image files or associated files have been added to the database. If new files have been added or changed, then a low resolution image file is formed for each new image and data changes are appropriately communicated to the service provider 80 for storage and association with the user low resolution image collection.

As previously discussed, in addition to the low resolution images stored at the service provider 80, there can be stored various other data/information related to these images. This information can be used to identify who can have access to the low resolution image and information that describes the content of the images. In addition, this information can include information relating to the data storage structure of the high resolution images stored on image storage device 14. The data storage structure information includes parameters that reflect the storage locations of the high resolution image media files on the physical media such as track and sector information associated with hard disk memory architecture. This information can be used to assist in the rebuilding of a damaged directory in the event of a failure of storage device 14 and can be automatically updated on a routine communication interval by the service provider 80. Oftentimes, damaged directories on hard disks can render a disk drive unreadable when the actual file data is still valid. Software running on the user computer 10 such as the commercially available Norton Utilities offered by Symantec Inc. can restore the accessibility of high resolution image media files using the data storage structure information related to the low resolution image media files stored by service provider 80 as later discussed herein with respect to FIG. 14. Service provider 80 can provide this additional service for a fixed or recurring fee. This can provide valuable assistance in reconstructing damaged digital image files on user computer 10.

Figures 10A, 10B:
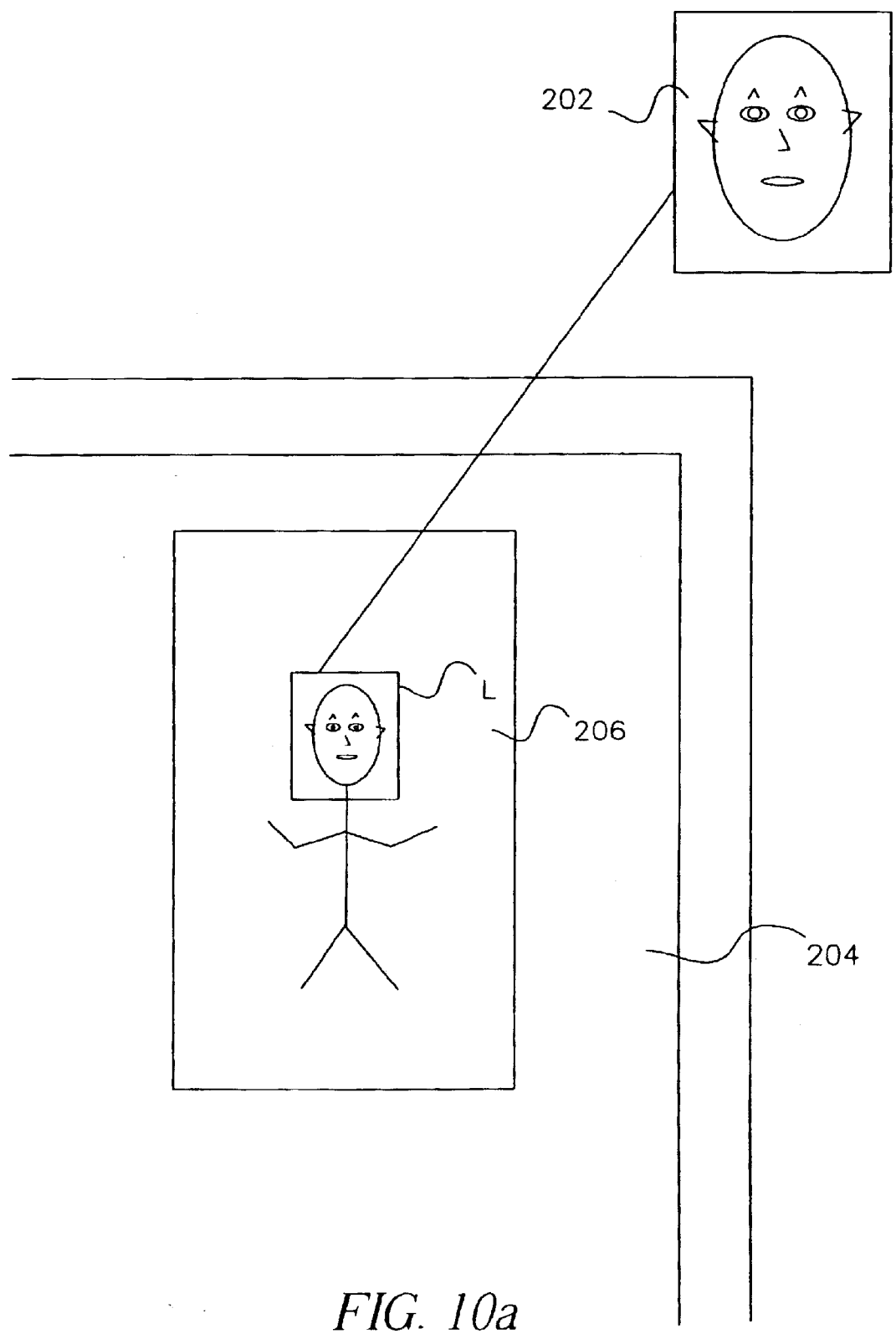

Further information can be provided to the service provider 80 for assisting in identifying content of the images and/or individuals that can have access to the images. For example, an image icon 202, such as illustrated in FIG. 10b can be used as a content identifier to first identify content of images forwarded to the service provider 80. In the embodiment illustrated, the image icon 202 is in the form of the face of an individual taken from image 206 of FIG. 10a. Thus face recognition software programs, such as described in copending U.S. pending patent application entitled A METHOD AND SYSTEM FOR CATALOGING IMAGES, of John R. Squilla and Dale Fredrick McIntyre, Ser. No. 09/640,938, filed Aug. 17, 2000 which is hereby incorporated in its entirety by reference, can be used to review the images to be forwarded and identify the images with such content identifiers. When such images are identified, the identification information is recorded as metadata and stored in association with that image. The identification information can be used to identify who can view this image at the service provider 80 or even provide an automatic forwarding of the image to a specified individual. While the images can be automatically analyzed for such information, the user can also specify that a particular icon 202 be associated with a particular image.

While the icon 202 has been shown for use in identifying other individuals found within digital images to which said images are to be forwarded, the present invention is not so limited. The icon 202 can also be used to identify images that the user wishes to be sent to him. For example, the icon 202 can represent the face of the user and that when the icon 202 is sent to a third party it can be used to identify images that include the user. The icon 202 can also be provided with information, such as a Universal Resource Locator (URL) address, where the image is to be sent. The icon 202 can be sent to specific third parties wherein the third party would provide consent to have their images reviewed for forwarding to the user who provides the icon 202. The service provider 80, upon request from the user providing the icon 202, can search the low resolution image collections of other users for occurrences of the icon 202 applied to their images. Upon finding images of other users that have applied the icon 202 of the user providing the icon 202, service provider 80 can automatically forward these images to the user providing the icon 202. Furthermore, service provider 80 keeps a log or record of the other users who have used the icon 202 provided by the user. Thus the service provider can monitor access and/or use of digital media files associated with the icon 202. When the user updates their icon 202, for example, when their appearance changes due to aging, modifications to hair style or color, modifications to facial hair etc., service provider 80 automatically updates the icon 202 for those users found in the log associated with the use of the specific updated icon 202. The updated icon 202 can replace the existing icon 202 or it can be simply added to the database of icons 202. Allowing the two icons 202 to coexist permits the recognition of high resolution image files that can be scanned and provided at a substantially later date. The icon 202 can also be used to access public sites that have images that can be used freely or for a price. While the icon 202 has been described as recognizing images containing a particular individual, the icon 202 can represent any theme, for example, any sports, hobby, or item. Images that have been identified with any such theme can be automatically forwarded by service provider 80 to the image collection of a special interest group that a user may belong to. Such preferences for forwarding are stored at service provider 80 as previously discussed.

Figure 5:
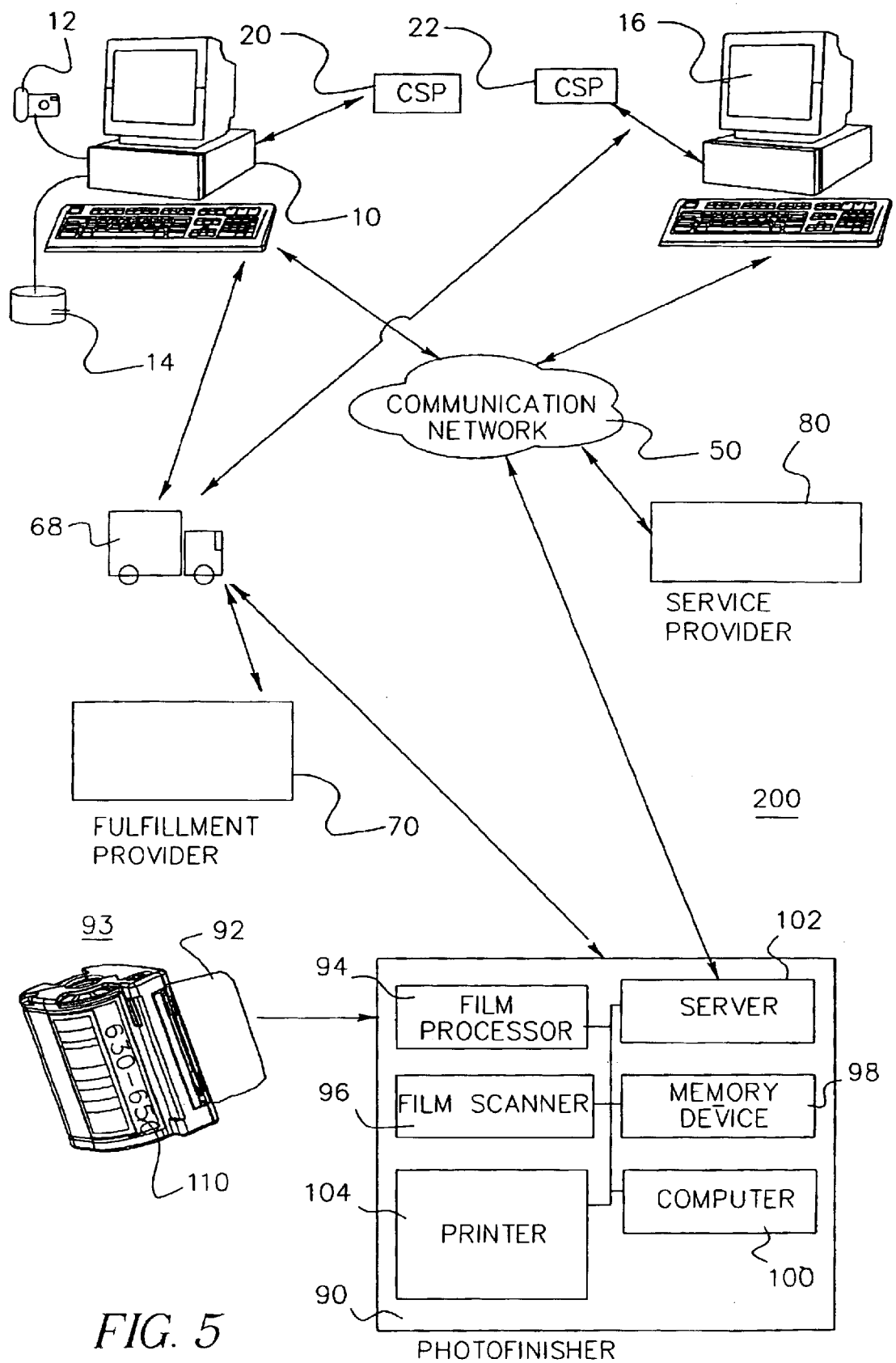
FIG. 5 is a modified system made in accordance with the present invention showing the relationship of a user desiring to share digital images with a third party as permitted by a service provider.

Further information such as loyalty points can be associated with the user by the service provider 80 in response to interactions with the system 18 or the system 200 (FIG. 5). For the purpose of the present invention, loyalty points shall be considered discounts, credits or other value assessed on behalf of the user which are credited toward the purchase or sale of goods and/or services. For example, a user who shares at least one of the low resolution image media files with an authorized third party, can earn loyalty points from service provider 80, if the authorized third party orders image based goods and/or services from service provider 80 that are derived from the shared low resolution image media files. Service provider 80 can award more points to a user who shares with an authorized third party that doesn't currently have an existing relationship with service provider 80. Incentives, in this case, are placed on encouraging additional users to develop relationships with service provider 80. To award loyalty points, service provider 80 can maintain a log or record of all accesses to images maintained in a user's image collection. This arrangement has the added benefit of providing a tracking mechanism in the event that an authorized third party misuses an image file provided by a user. Loyalty points can be redeemed at service provider 80 or fulfillment provider 70 for image related goods and/or services. See FIG. 12 for a more complete description of this operation.

Another process of earning loyalty points will be discussed later with respect to FIG. 18 and can include authorized third parties performing extended services such as cataloging by matching the user's content identifiers to the user's digital images to be cataloged. Rewarding an authorized third party with loyalty points for matching the user's content identifiers to the user's images relieves service provider 80 from the image processing burden.

Service provider 80 includes a server 82 for interfacing with the communications network 50 such as the Internet or a virtual private network (VPN). In addition to interfacing to the communications network 50, server 82 transfers information to computer system 86 which manages information associated with various users. Computer system 86 includes an account manager 84 which is software operating in accordance with the invention to permit the creation and management of individual user accounts. Information associated with user accounts is stored in relational database(s) 88. User account information includes personal information such as name and address, billing information such as credit card information, network information such as personal electronic location information and authorization information which controls access to the user's images by third parties. Also associated with user accounts are relational database(s) 88 which store low resolution user image files, related metadata and other information relevant to providing services to the user. One such example, but not by way of limitation, is a defect and directory map of the user's physical storage device to aid in the recovery of damaged image media files stored on the storage device 14.

Also shown in FIG. 1 is fulfillment provider 70 which provides image-based goods and/or services to users and third parties. Fulfillment provider 70 includes a fulfillment web server 72, a digital printer 78 and a fulfillment computer system 76 that further includes a commerce manager 74 and a fulfillment manager 75. Fulfillment requests received from service provider 80, user computer 10 or third party computer 16 are handled by commerce manager 74 initially before handing the requests off to the fulfillment manager 75. The fulfillment manager 75 determines which equipment is used to fulfill the ordered good(s) such as a digital printer 78. After fulfillment, the ordered goods are returned to the ordering party by a delivery means for example, but not by way of limitation, a transportation vehicle 68.

Figure 2:
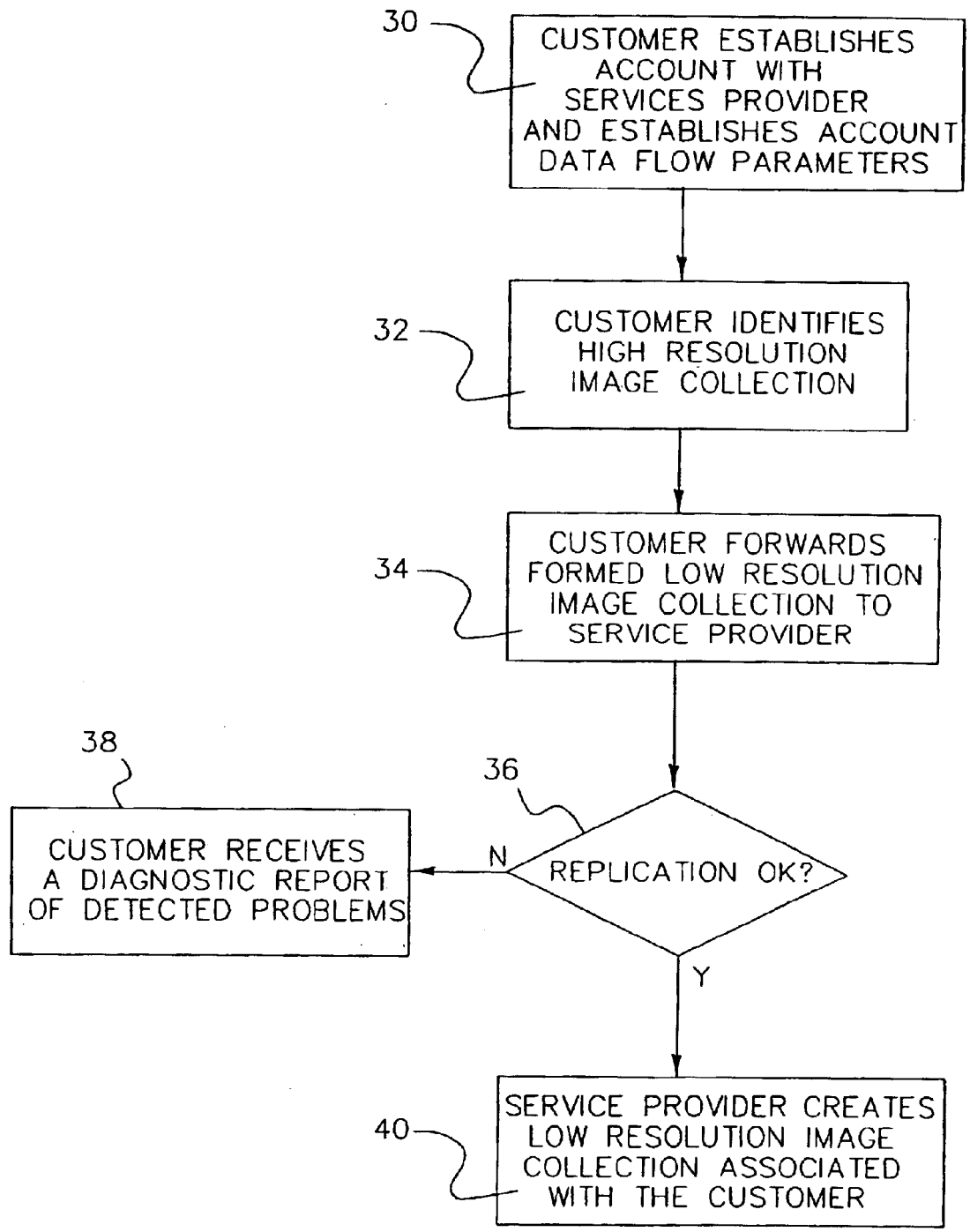
FIG. 2 is a flow chart which shows the steps in creating a user account and image storage file in accordance with the invention.

In order to better understand the present invention, a description of the operation of the system 18 will be discussed. FIG. 2 is a flow chart of the operation of the system 18. In the first step 30, the user establishes an account with the service provider 80. As a part of establishing an account, various information is provided, for example, but not limited to, name, address, electronic address, credit card information, names of individuals or business establishments that have permission to access image media files, names of any particular files of grouped images and authorized viewer, the type of access granted, name of a preferred fulfillment service provider for the providing of goods and/or services and automatic forwarding instructions per selected criteria. It is of course to be understood that any other relevant information and/or instructions can be provided as desired or that which the service provider is cable of providing. In the next step 32, the user identifies or establishes the high resolution media collection. In the next step 34, low resolution digital image files are formed from the high resolution digital image files in the collection and are forwarded to the service provider 80 along with any appropriate associated data files (user low resolution image collection) over the communication network 50. At the next step 36, the verification that the service provider 80 has received the low resolution media files is completed. If the transfer of the low resolution media collection was not successful, the user is advised of this non-successful transmission in step 38 and repeats the transmission of the low resolution media collection in step 34 until successful. Upon successful receipt of the low resolution media collection, the service provider 80 at step 40 creates a low resolution media collection where these low resolution media collections are stored and associated with the user.

Figure 3:
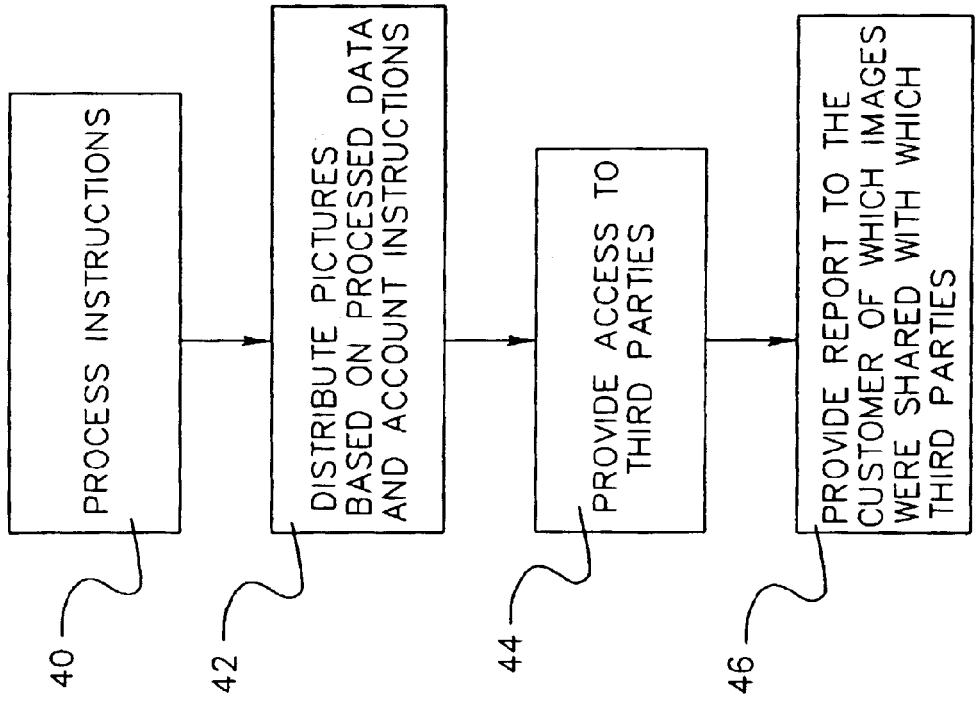
FIG. 3 is a flow chart which shows the steps in automatically sharing digital images with an authorized third party in accordance with the invention.

Referring to FIG. 3, there is illustrated a flow chart of one way in which the media files stored at the service provider 80 can be used. In step 40, the instructions previously provided by the user are reviewed and implemented. For example, if a third party has been designated to automatically receive selected media files as identified, these media files will be forwarded over the communication network 50 to the designated third party at step 42. As illustrated by FIG. 1, this can be a third party computer 16. Alternatively, the selected media files can be forwarded to a fulfillment provider 70 location for fulfillment of a service or product, such as producing a print for delivering to a designated individual from a fulfillment provider 70. While the fulfillment provider 70 can use the low resolution media file for the fulfilling of the requested goods and/or services, often, the fulfillment provider 70 needs the high resolution digital image. In such case, the provider 80 can directly access the high resolution files directly from the user or have them provided through the service provider 80. Typically the fulfillment provider 70 comprises a facility for printing or producing images from digital media files that have been provided by users and delivering them to designated locations. However, the fulfillment provider 70 can deliver any goods or services that they are capable of providing. For example, but not by way of limitation, the goods can include T-shirts, mugs, cakes, or any other goods or services that incorporate images provided by the user.

In another form of the present invention, at step 44 a third party can access the low resolution image collection over the communication network 50 using third party computer 16. Optionally in Step 46, the service provider 80 can produce and transmit a report to the user that monitor the details of which media files were shared or accessed by which third parties.

Figure 4:
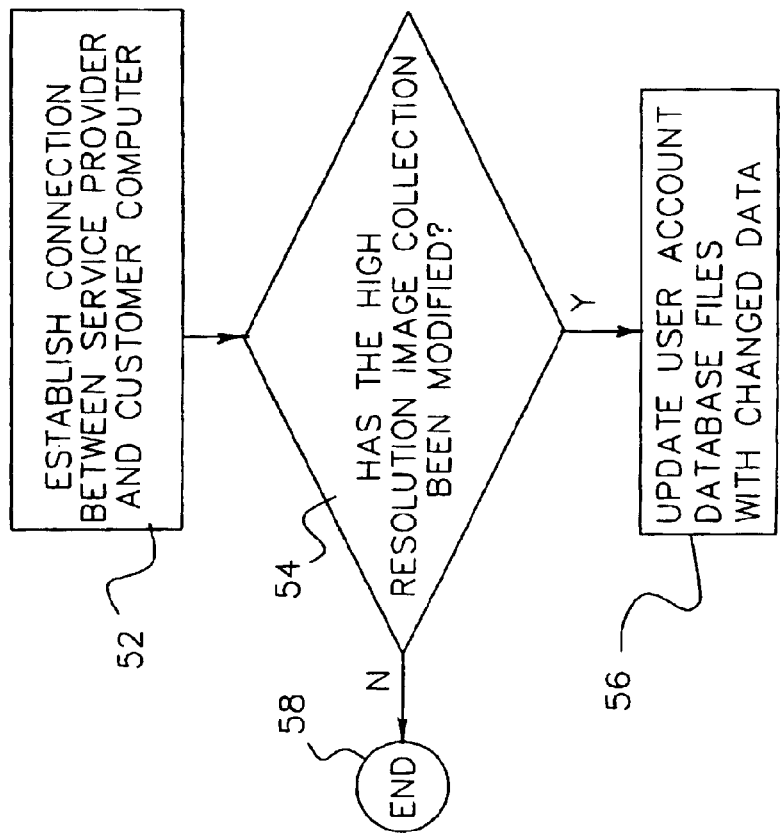
FIG. 4 is a schematic diagram showing the relationship of a film processing photofinisher desiring to download digitized film images with a user as permitted by a service provider.

Turning now to FIG. 4, there is illustrated a flow chart representing a process used by service provider 80 for automatically updating the low resolution image collection associated with a user during a regular and periodic update or replication procedure. At an agreed upon routine communication interval, service provider 80 establishes a connection with user computer 10 (step 52). The connection can either be established by the user computer 10 initiating communication or by the service provider 80 initiating the communication. The service provider 80 then checks to see if the high resolution image collection has been modified (step 54). Modifications to the high resolution image collection can include the addition or modification of at least one image media file, additions and/or modifications to metadata, modifications to the user account information such as the addition or deletion of authorized third parties, or any other desired changes to the user account information. Once this information has been obtained, service provider 80 makes the appropriate changes (step 56) to the user account and/or low resolution image collection. Relational database(s) 88 are updated with the updated information. If no modifications to the high resolution image collection are detected (step 54), the service provider 80 concludes the communication in step 58.

Turning now to FIG. 5, there is illustrated a modified system 200 made in accordance with the present invention. System 200 is similar to system 18 with like numerals indicating like parts and operation as previously discussed. In system 200, a photofinisher 90 is provided for processing of photographic film 92. It should be noted that the photofinisher 90 can be a retail establishment by itself or operating in association with a wholesale photofinishing establishment. In the particular embodiment illustrated, the photofinisher 90 includes a film processor 94 for developing of the images on photographic film 92. A film scanner 96 is provided for scanning of images formed on the processed film for obtaining high resolution digital image files that are forwarded to a memory device 98 as high resolution image files. The photofinisher 90 also includes an appropriate computer 100 for managing of the various equipment and various operations of the photofinishing system. One such operation is the attachment of metadata to the high resolution image file that identifies the specific photofinisher via a pre-assigned unique business identifier. In the case where the photofinisher 90 is a wholesale photofinisher operating in association with a retailer, separate business identifiers are attached as metadata to the high resolution image media files linking both wholesale photofinisher and retailer to the specific photographic film 92 and the processed images associated therewith. Another operation of computer 100 is the providing of information to a server 102 for communicating over the communication network 50 to various third parties. The photofinisher 90 also includes an appropriate printer 104 for printing of images that have been scanned onto an appropriate media, for example, photographic paper, thermal media, etc. It is, of course, understood that any other appropriate output device can be provided for producing prints or other products incorporating images that have been obtained from the scanning of the developed photographic film 92.

Figure 6:
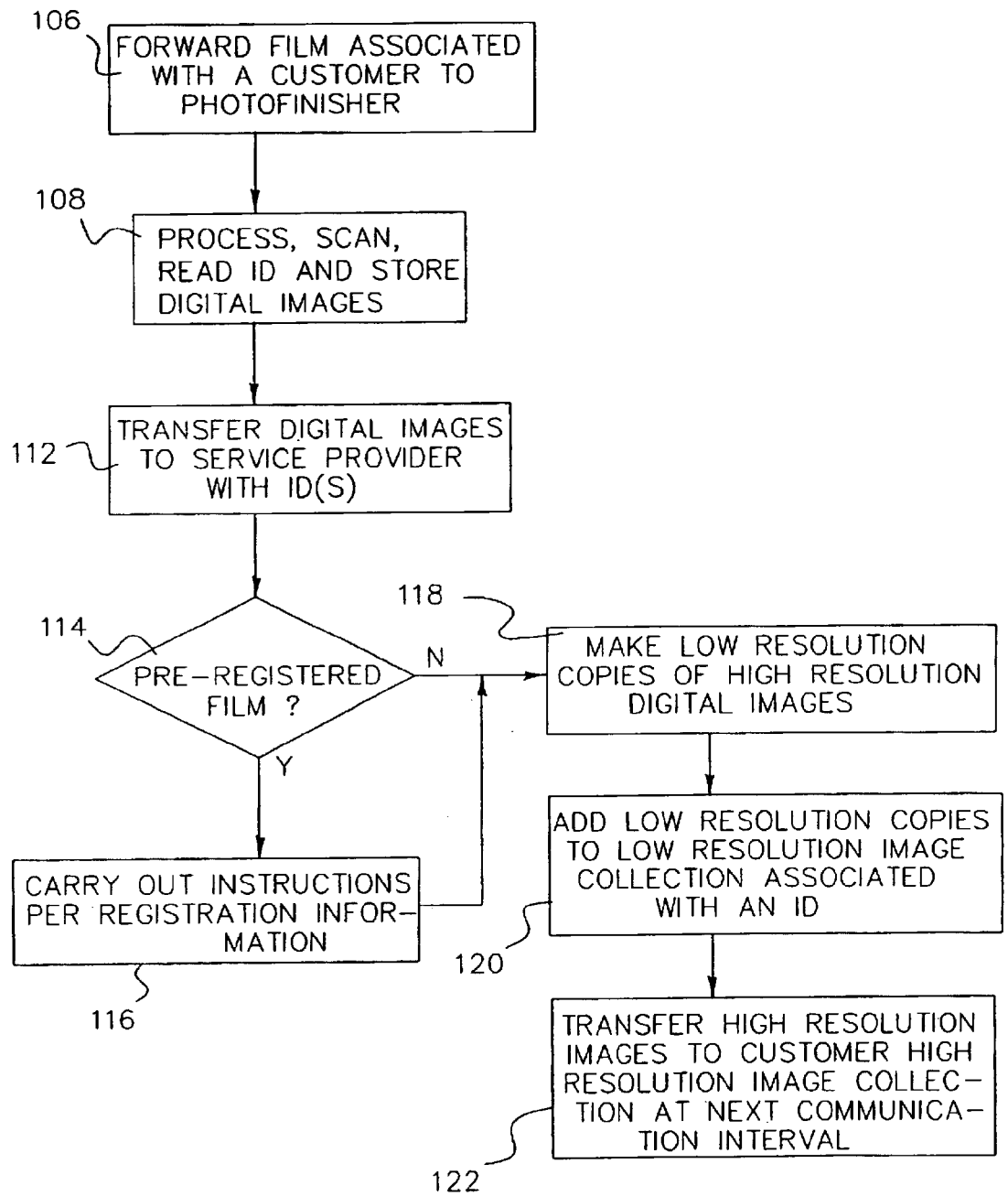
FIG. 6 is a flow chart which shows the steps of the method of operation of the system of FIG. 5.

Referring to FIG. 6, there is illustrated a flow chart of one method of the operation of the system 200 of FIG. 5. A roll of exposed, undeveloped photographic film 92 provided, for example, in a film cartridge 93 is forwarded to the photofinisher 90 (Step 106) in association with the user. In the next step 108, the photofinisher 90 develops the film 92 and scans the developed images for producing high resolution image files that are temporarily stored on memory device 98 with metadata identifying the photofinisher 90 as the retailer or separably as the retailer and photofinisher as discussed earlier. The photofinisher 90, in the embodiment illustrated, further associates an unique identification (ID) 110 that is provided on the film 92 with the scanned images and hence, the high resolution image files. Such an unique ID 110 can also be attached to a user order in a variety of ways. For example, but not by way of limitation, the unique ID 110 can be associated with a photofinishing envelope (not shown), the film cartridge 93, pre-exposed on the film 92 itself, by random assignment, or any other appropriate way to associate the film 92 and the user. Unique ID 110 can be appended as metadata to the high resolution image media file upon scanning to associate the digital image with the user. Commercially available film products manufactured by the Eastman Kodak Company under the Advantix™ brand are examples of film cartridges 93 having the unique ID 110 associated with them.

Continuing on with FIG. 6, these high resolution media files and unique ID 110 are transferred via communication network 50 to the service provider 80 in association with the user at an appropriate time (step 112). Following receipt of the high resolution media files, service provider 80 (step 114) checks to see if the unique ID 110 has been registered with specific processing instructions. A more complete description on one method of registering film with a service provider can be found in co-pending U.S. patent application entitled A Kit For Organizing A Plurality Of Images, Ser. No. 09/470,938, filed Dec. 22, 1999 by Dale Fredrick McIntyre and Joseph Anthony Manico which is hereby incorporated in its entirety. If the photographic film 92 is not registered, service provider 80 creates low resolution copies of each of the newly received high resolution files in step 118. These low resolution copies are then added to the user's existing low resolution image collection in step 120. The high resolution files are temporarily stored at the service provider 80 until they are transferred to the user's high resolution image collection on the user computer 10 at the next routine communication interval or non-scheduled communication (step 122). In an alternate embodiment of steps 118, 120 and 122, service provider 80 can store the high resolution image files for an ordering period that makes ordering of image goods and/or services by the user or authorized third parties more convenient. The storing of the high resolution image files for the ordering period is in addition to transferring the high resolution files to the user computer 10. After the expiration of the ordering period, the high resolution image files are automatically converted to low resolution copies and added to the user's low resolution image collection. This would be particularly useful to a service provider, in that, initial interest in obtaining prints or other image products/ services usually occurs in a relatively short time after obtaining the image. Thus, making the need to obtain the high resolution file from user computer 10 unnecessary during this ordering period.

If the photographic film 92 is registered, instructions associated with the registration are carried out by the service provider 80 in step 116. These instructions can include for example, but not by way of limitation, the directions to print, automatically transmit to various third parties and deliver various image-based goods and/or services to the user or third parties designated in the instructions. Third parties that have similar arrangements for low resolution image media collections maintained by service provider 80 will receive the automatically transmitted low resolution image media files as additions to their low resolution image media collections. At the next routine communication interval for these third parties, these low resolution image media files are automatically transferred to the third parties' computers 16. Software running on each third party computer 16 causes newly transferred image media files to be presented to the third party without needing to use the process of attaching/ detaching operations found in traditional electronic mail protocols. This process will be discussed in further detail with respect to FIG. 11 later in this specification.

After completing the registered instructions, service provider 80 creates low resolution copies of each of the newly received high resolution image files in step 118. These low resolution copies are then added to the user's existing low resolution image collection in step 120. The high resolution image files are temporarily stored at the service provider 80 until they are transferred to the user's high resolution image collection on the user computer 10 at the next routine communication interval. It is of course to be understood that any associated digital files can also be communicated to user computer 10.

Figure 7:
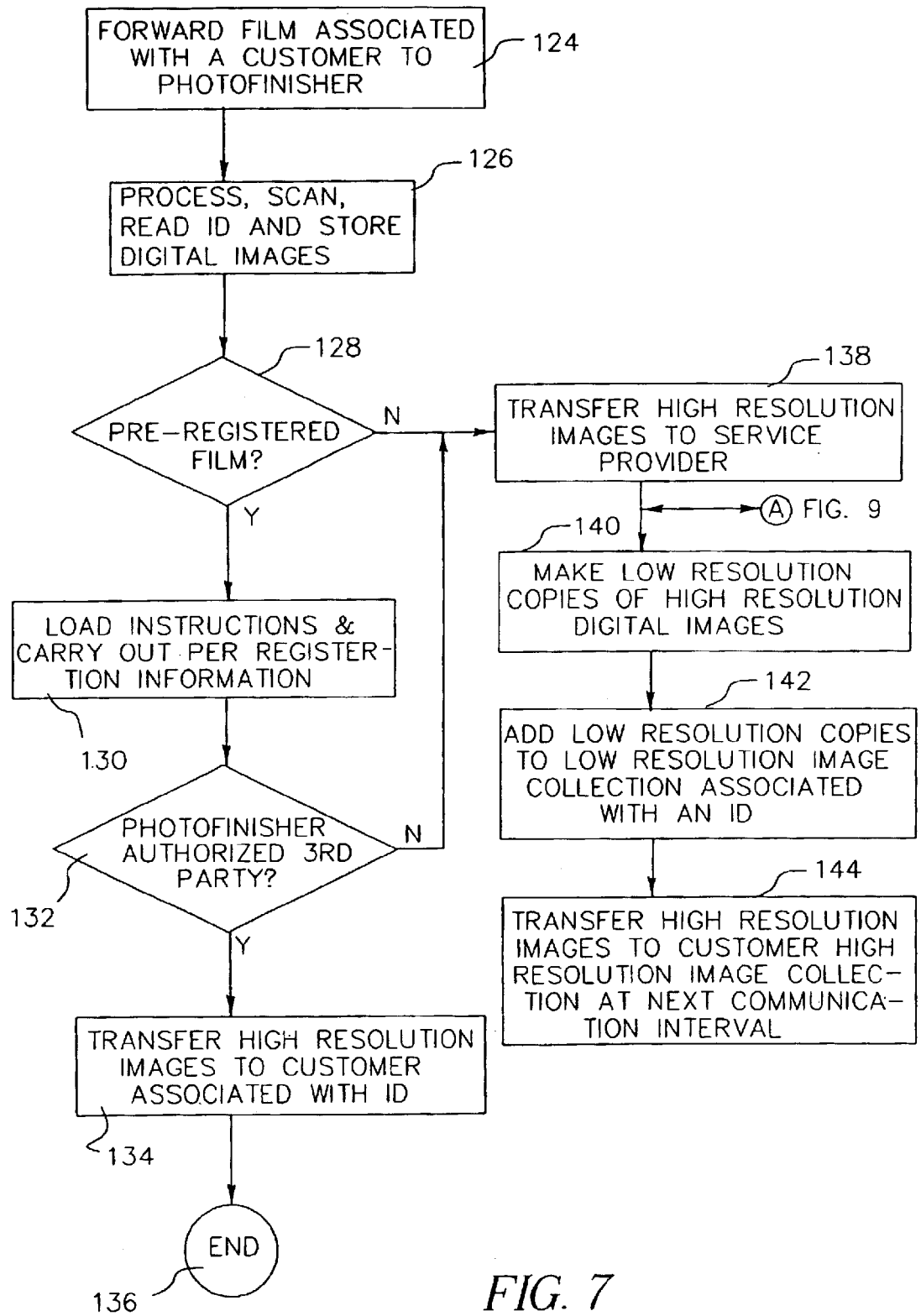
FIG. 7 is a flow chart which shows the steps of another method of operation of the system of FIG. 5.

Another method of operating the system 200 is shown as a flow chart in FIG. 7. In this embodiment, photographic film 92 associated with the user is forwarded to the photofinisher 90 in step 124. The photofinisher 90 in step 126 processes the photographic film 92, reads the unique ID 110, scans the developed film images, forms high resolution image files and temporarily stores them in memory device 98 associated with the user and the photofinisher 90 as discussed earlier. In step 128, photofinisher 90 establishes a communication connection via communication network 50 to service provider 80 and passes the unique ID 110 to service provider 80 to see if the photographic film 92 has been registered and has instructions pertaining to the ordering of image related goods and/or services. If the photographic film 92 had been registered, photofinisher 90 carries out the instructions (step 130) which can by way of example, but not limitation, include printing additional copies of the high resolution image media files to be forwarded to a third party via delivery vehicle 68.

If the photofinisher 90 has been determined to be an authorized third party in step 132, the photofinisher 90 can transfer (step 134) the high resolution image files from the memory device 98 to the user computer 10. The updated high resolution media image collection on user computer 10 will be detected and the appropriate low resolution image files formed and transferred to the low resolution image media collection maintained by service provider 80 at the next routine communication interval. At this point, the photofinisher 90 reaches the conclusion of the activity in step 136.

If the photofinisher 90 is not an authorized third party (step 132), photofinisher 90 transfers the high resolution digital image files to the service provider 80 (step 138). The service provider 80 then creates low resolution image file copies of each high resolution digital image file (step 140), adds them to the low resolution image media collection associated with the user (step 142) and transfers the high resolution digital image files to the user computer 10 (step 144) at the next communication. Optionally, after step 138, service provider 80 can additionally implement the steps marked at point "A" illustrated in FIG. 9 to the conclusion of that flow chart. These additional steps, as shown by FIG. 9, compare the newly digitized and transferred high resolution image files with the content identifiers for the automatic routing of and adding information to form image media files based on identified content within the high resolution image files.

Figure 8:
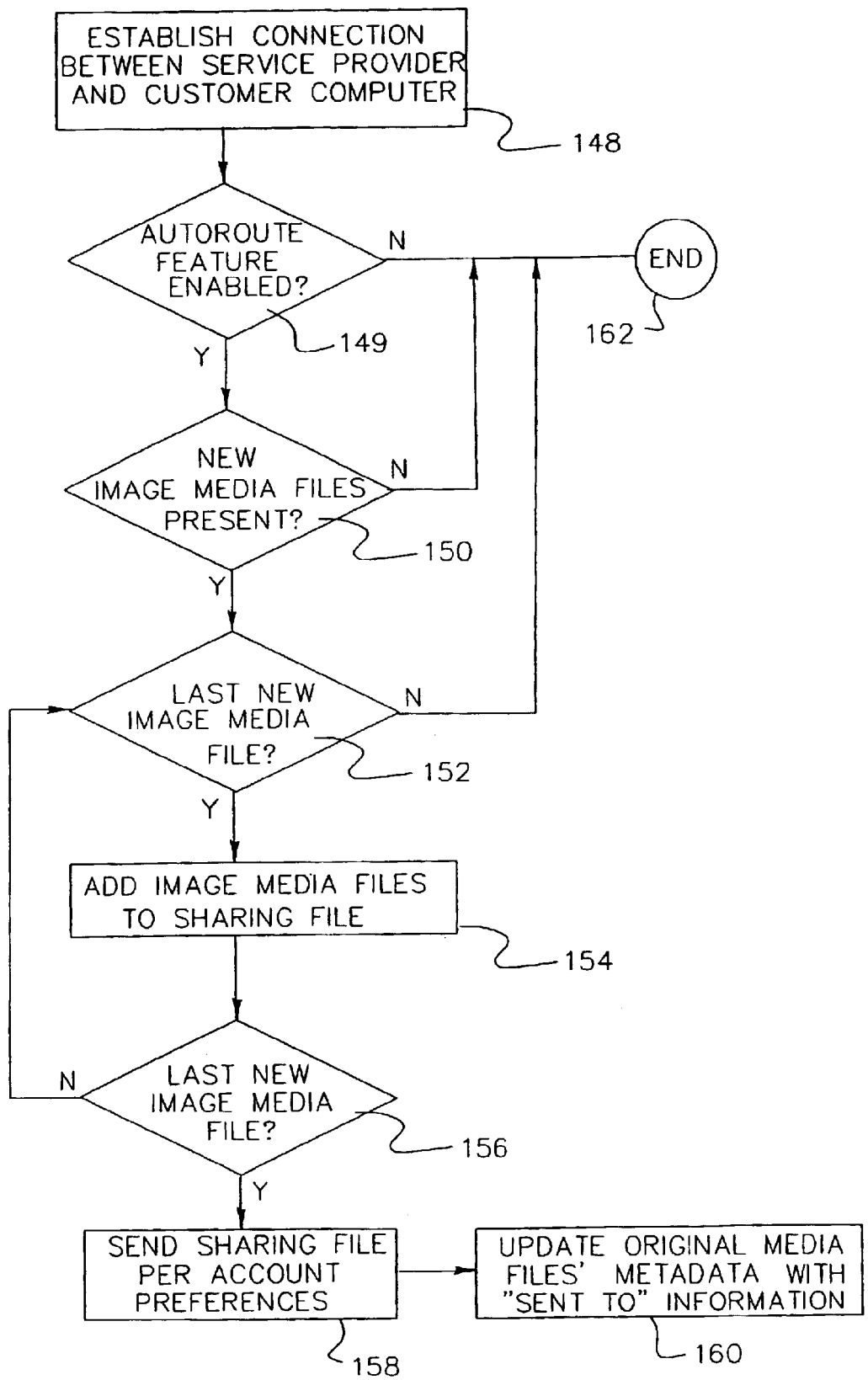
FIG. 8 is a flow chart which shows another method of sharing images using the system of FIG. 1 or FIG. 5.

The flow chart of FIG. 8 shows another method for sharing of the media collection wherein the user has provided information regarding the content of the files to be shared using software operable on user computer 10. The information has been stored as metadata associated with the image file within the high resolution image media collection on the user computer 10 or storage drive 14. In step 148, a connection is automatically established between service provider 80 and the user computer 10. Optional step 149 reflects system 200 permitting the user to turn "on" or "off" the feature of automatically routing an image media file to a third party. If the autoroute feature is turned off, the rest of this flow chart doesn't apply, ending the process in step 162.

Continuing at step 150, service provider 80 determines if a new media file has been added to the high resolution image media collection on the user computer 10. Upon finding new high resolution image media files, service provider 80 examines the metadata associated with the new high resolution image media file for specific sharing metadata at step 152. For example, a high resolution image media file that is a still image of "John" has been annotated by the user as "John". In the user's supplied account information with service provider 80, "John" has been correlated to an electronic mail address as john.doe@service.com. Sharing this image media file (step 158) causes an electronic mail message to be generated and forwarded to john.doe@service.com. Alternatively, "John" also has an account and low resolution image media collection with service provider 80. Sharing (step 158) in this alternative example, is accomplished by a direct file transfer from the low resolution image media collection of the user to the low resolution image media collection of "John". Intermediate steps 154 and 156, allow service provider 80 to aggregate multiple image media files to be shared with the same third party. After sharing the image media files in accordance with the examined metadata, the new image media files within the high resolution image media collection are updated (step 160) with the metadata of which third party they were shared with.

Figure 9:
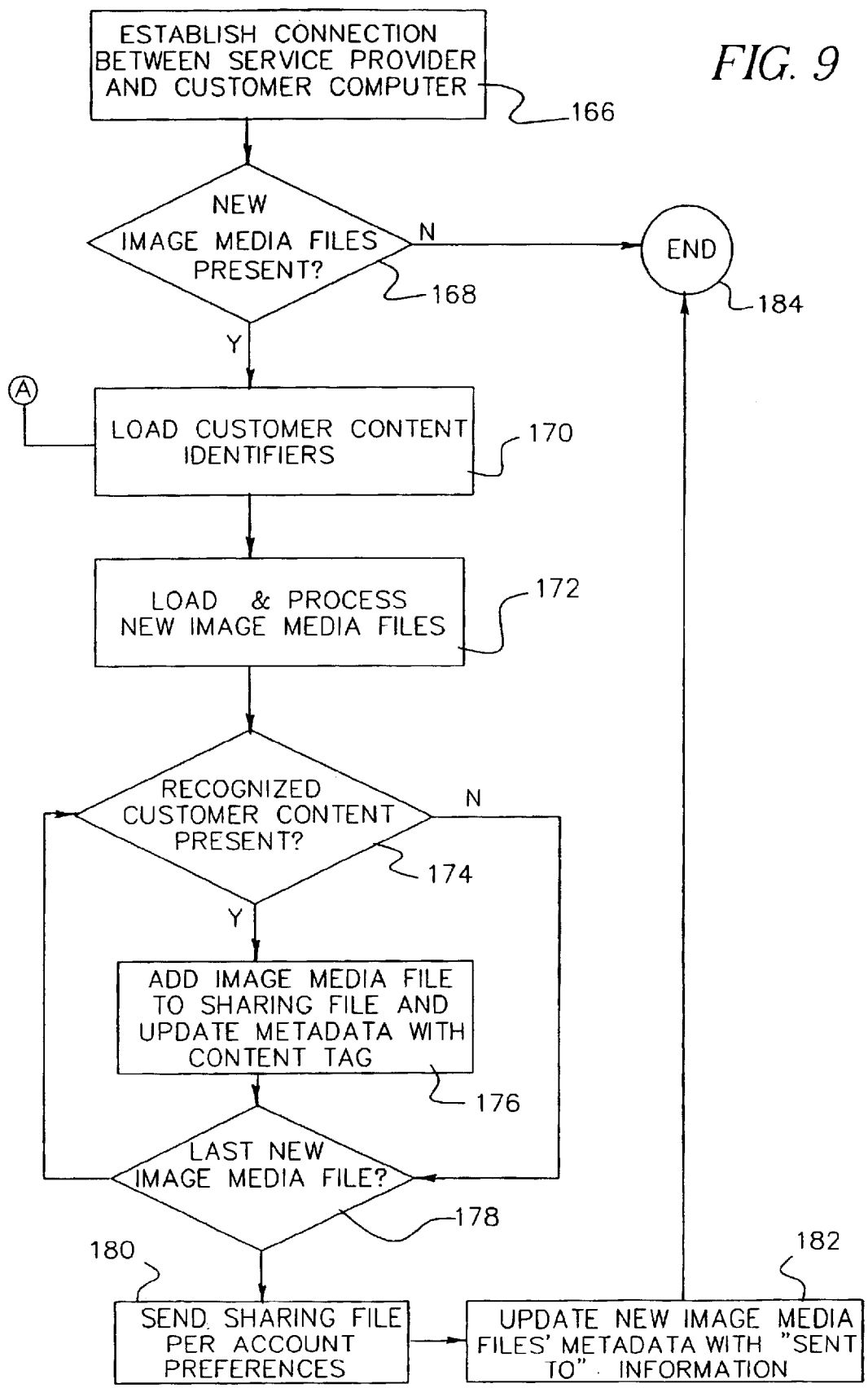
FIG. 9 is a flow chart which shows yet another method of sharing images using the system of FIG. 1 or FIG. 5.

Turning now to FIG. 9, another method for the sharing of and adding non-image information to image media files is shown as a flow chart wherein system 200 analyzes the content of the image media files and automatically shares those image media files with authorized third parties in accordance with instructions stored at service provider 80 in association with the user. System 200 additionally stores information associated with recognized content as metadata with the image media files. Beginning with connecting to user computer 10 in step 166, system 200 checks the high resolution image media collection for new added files (step 168). If no new files have been added, the current process ends in step 184. Upon finding new files (step 168), the computer system 86 of service provider 80 loads user content identifiers (step 170) from relational databases 88 associated with the user. Continuing on with step 172, computer system 86 processes the newly added files against the user content identifiers in accordance with the aforementioned U.S. patent application of John R. Squilla and Dale Fredrick McIntyre, Ser. No. 09/640938, previously discussed. The processed high resolution image files with recognized content have metadata appended to them as determined by the content identifiers. Steps 174, 176 and 178 iteratively examine the processed image files for recognized content, add the information associated with the recognized content as metadata and create a sharing image media file that can include a plurality of the processed image files to be shared with a single third party. The sharing file is sent to a third party identified by the associated content identifier in step 180 following which, the image files have "sent to" metadata stored in association with the specific image file (step 182) both in the low resolution image media collection stored at the service provider 80 and the high resolution image media collection stored in the user computer 10 or storage device 14.

FIG. 10 is a partial view of the display screen 204 of user computer 10 wherein a representative image 206 of the high resolution image media file is displayed. Dotted line "L" indicates selected image content identifier and results from an action taken by software running on the user computer 10 in response to a user acting with a selection device such as a computer mouse or in response to an algorithm for identifying content. The selected image content identifier forms the image icon 202 as shown by FIG. 10*b* which is a form of content identifier.

Figure 11:
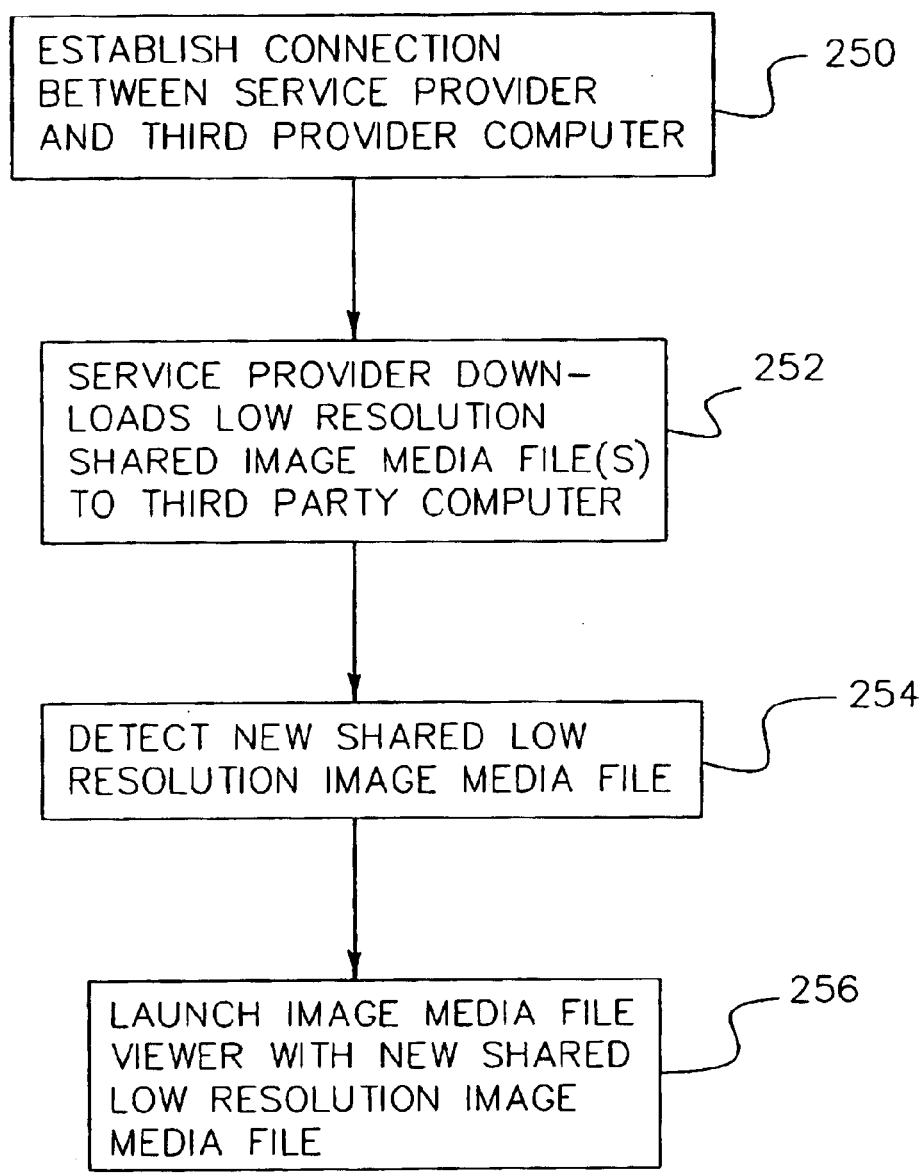
FIG. 11 is a flow chart of still another method of operation of the system of FIG. 5.

Turning now to FIG. 11, there is illustrated a flow chart for operating another aspect of system 18 and modified system 200. Beginning in step 250, service provider 80 establishes a connection with third party computer 16 over communication network 50 for the purposes of transferring low resolution image media files sent to the third party by the user. After establishing a working connection, service provider 80 downloads the low resolution image media files to third party computer 16 (step 252) which detects the newly shared low resolution image media files, (step 254) and launches a low resolution image media file browser such as standard slide show software (step 256) thus eliminating the need to detach an image media file from an e-mail message and launch an image viewing application.

Figure 12:
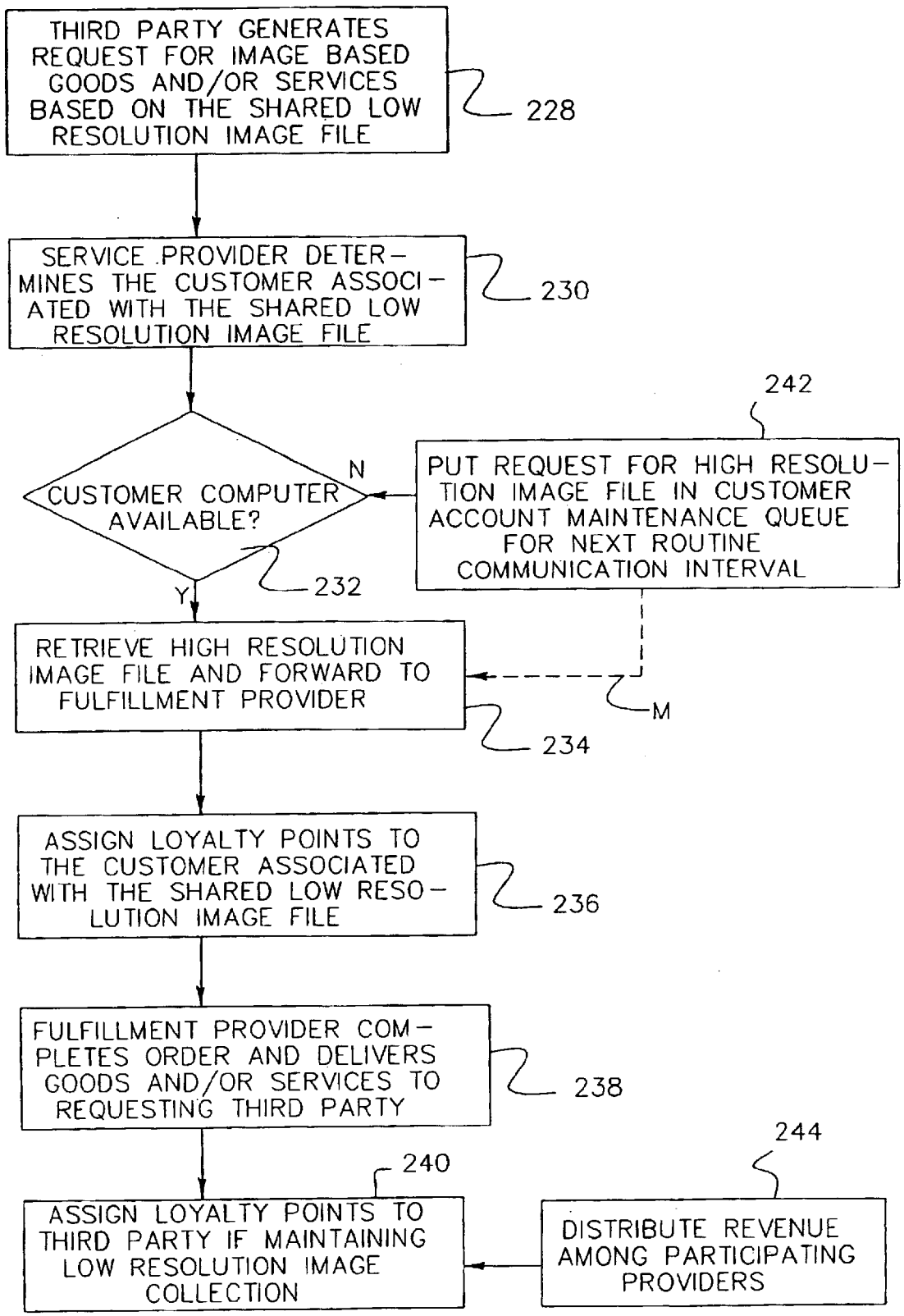
FIG. 12 is a flow chart which illustrates the process of tracking an individual low resolution image file used to produce goods and/or services.

Turning now to FIG. 12, a flow chart illustrates the process of tracking an individual low resolution image media file associated with a user when it is used by an authorized third party for producing image based goods and/or services and awarding loyalty points to the user. Beginning with step 228, an authorized third party places an order for image based goods and/or services with service provider 80 based on a low resolution image media file shared by the user. The authorized third party also provides a form of electronic payment such as a credit card to service provider 80 in a manner well understood in the art for electronic commerce transactions. Service provider 80 needs the high resolution image media file to forward to fulfillment provider 70. In step 230, service provider 80 determines the user who shared the low resolution image media file that the third party is using to place an image based order. This can be accomplished by looking at the metadata associated with the low resolution image media file as discussed earlier.

Continuing with step 232, the service provider 80 determines if the user computer 10 associated with the low resolution image media file is connected to the communication network 50. If user computer 10 is not available, the service provider 80 places a request (step 242) for the associated high resolution image media file with the account manager 84 for retrieval at the next routine communication interval indicated by the dotted line "M". Optionally, service provider 80 can send an e-mail message to the user to alert him/her that a high resolution image media file is required to fulfill an order. In yet another method of notification, service provider 80 can send an automated phone message to the user instructing him/her to make user computer 10 available. When the user computer 10 is operably connected to the communication network 50, the associated high resolution image media file is retrieved and forwarded to the fulfillment provider 70 in step 234. The user's account is then updated with loyalty points (step 236) assigned as a result of the transaction of the third party. The loyalty points can be assigned as a function of a dynamic look-up table managed by service provider 80. For example, a 4×6 hard copy print might earn 10 loyalty points, an album page 100 points and a Compact Disc (CD) 200 points and so on and so forth for other goods and/or services that can be offered by service provider 80 or fulfillment provider 70. The loyalty points can be dynamically adjusted by the service provider 80 in response to market conditions or levels of user orders. Similarly, new products might be offered with a temporary higher level of loyalty points to encourage their trial and use.

Figures 13, 14:
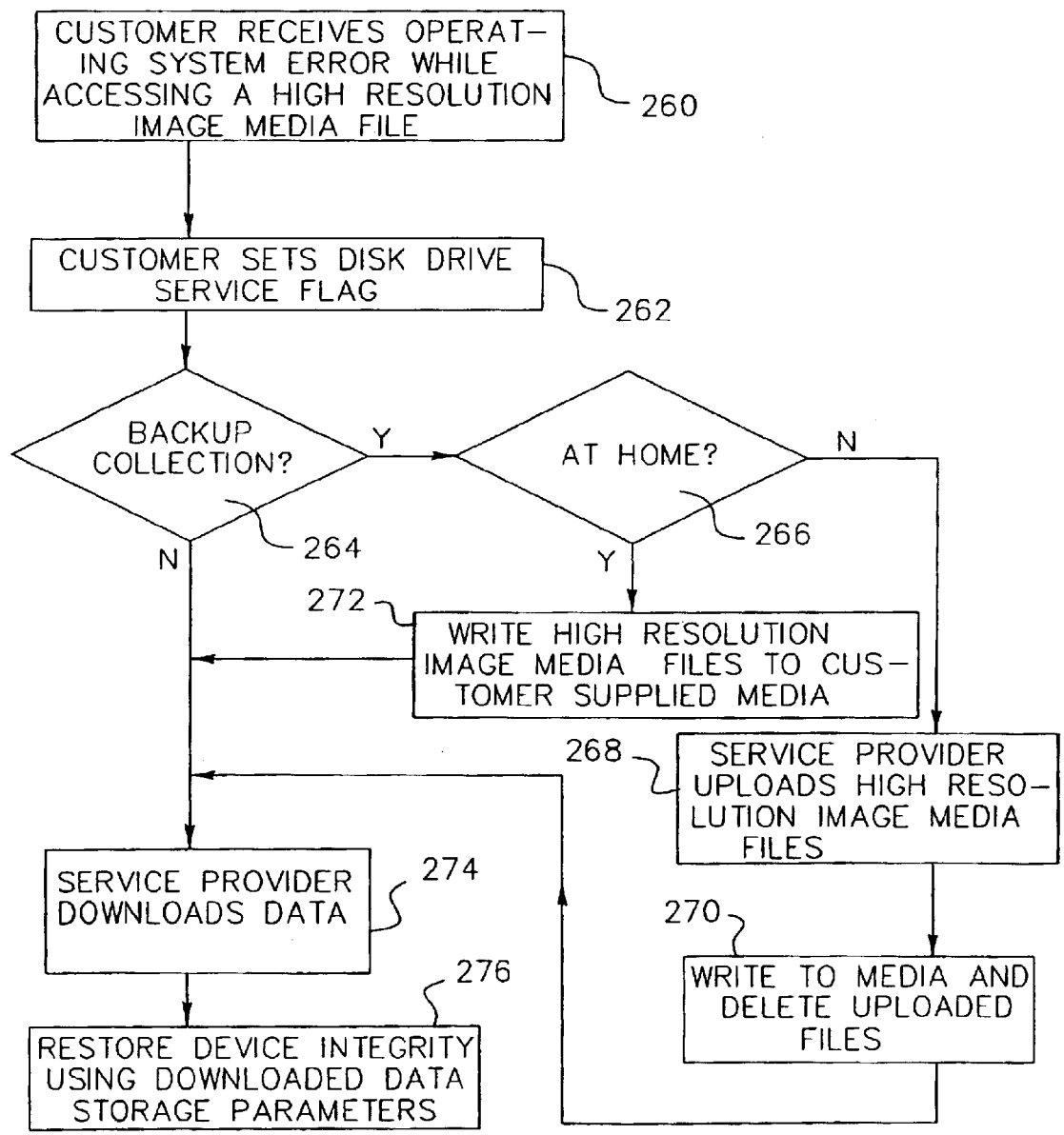
FIG. 13 is a chart illustrating an example of one way revenues can be distributed among various parties.
FIG. 14 is a flow chart of a method for restoring a high resolution image on a user device.

Fulfillment provider 70 completes the order placed by the third party and delivers the image based goods and/or services in step 238. If the third party has a similar arrangement for a low resolution image media file collection with service provider 80, account manager 84 assigns loyalty points (step 240) to the account of the third party based on this order. At the completion of the order, service provider 80 distributes revenues (step 244) collected from the third party to those providers associated with the developing, scanning, processing, printing etc. where such providers have contributed to the production of the ordered goods and/or services. An example of revenue distribution amongst various contributing providers is illustrated in the table of FIG. 13. If the service provider 80 also completes the fulfillment of the ordered goods, then the service provider 80 earns the designated percentage "D" that would normally have been distributed to fulfillment provider 70. A retail store, for example, could process, print and scan negatives earning the combined designated percentages of "B" and "C" of the revenue collected by service provider 80. It is of course to be understood that the amount of percentages can be any desired value.

Turning now to FIG. 14, there is illustrated a process for restoring data structure information for high resolution image files stored on storage device 14 in the event of a user device malfunction. Beginning in step 260, the user has received a disk read error while trying to view or otherwise use an image from the high resolution image media collection stored on storage device 14. Setting a disk drive service flag (step 262), the user is asked (step 264) by software running on the user computer 10, if they desire to back up the high resolution image collection onto removable storage media prior to servicing the malfunctioning disk drive. The user optionally can choose (step 266) to back up the high resolution image media collection at home onto a storage device operably connected to user computer 10 or via service provider 80 uploading all of the high resolution image files that weren't previously backed up. In step 272, the user has chosen to back up the high resolution image media files at home whereby software running on user computer 10 causes the appropriate high resolution image media files to be written to removable storage media supplied by the user. If backing up the high resolution image media files at home is not possible, then the user can request service provider 80 to perform this task in exchange for a service fee. At a convenient time, service provider 80 uploads (step 268) all the high resolution image media files not previously backed up. Continuing with step 270, service provider 80 writes the uploaded high resolution image media files to an appropriate removable media which was previously agreed to by the user. After completing the writing and verifying of high resolution image media files, service provider 80 causes the written removable media to be sent to the user and deletes (step 270) the uploaded high resolution image media files. Of course, the user can choose to pay an additional fee and keep all the high resolution image media files stored at service provider 80. Following the completion of backing up high resolution image media files, service provider 80 downloads (step 274) data storage parameters to the user computer 10 which are updated at each communication or on a periodic basis. Finally in step 276, software running on the user computer 10 uses the data storage parameters to restore the integrity of the storage device 14.

Figure 15:
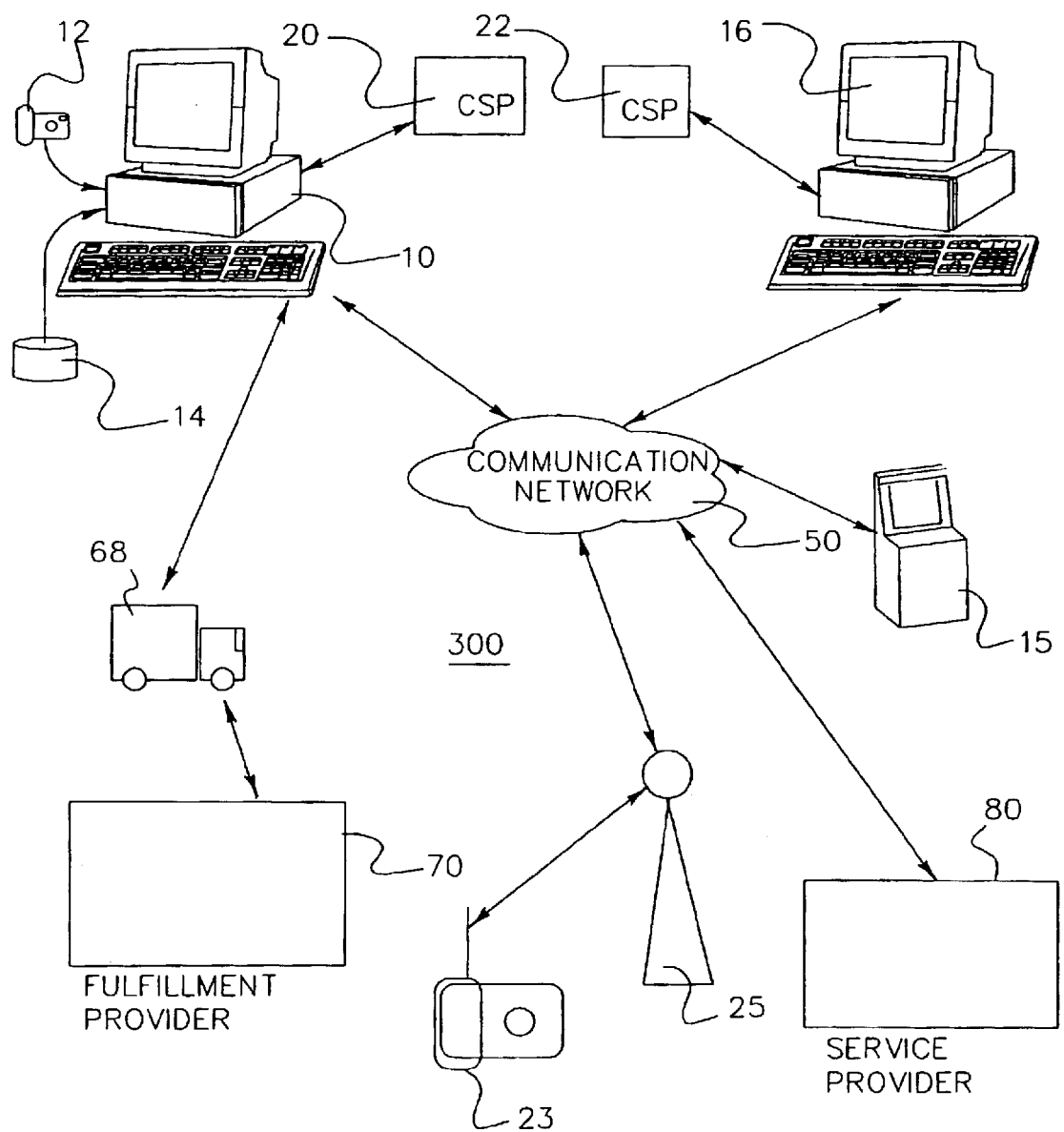
FIG. 15 is another modified system made in accordance with the present invention showing the relationship of a user desiring to share digital images with a third party as permitted by a service provider.

Turning now to FIG. 15, there is illustrated another modified system 300 made in accordance with the present invention. System 300 is similar to system 18 with like numerals indicating like parts and operation as previously discussed. In system 300, user computer 10 permits the storage of high resolution image media files provided from a number of image media file sources on storage device 14. High resolution image media files can be provided by photofinisher 90, as previously discussed, which provides high resolution image media files associated with the user to service provider 80 for eventual transferring to the user computer 10. There are many other ways in which image media files associated with the user can be provided to service provider 80 for transfer to the user computer 10. For example, high resolution image media files captured by a cellular wireless electronic (digital) camera 23 can be transferred to service provider 80 through a common telecommunications network 25, as described in commonly-assigned U.S. patent application Ser. No. 09/718,018, continuation filed Nov. 20, 2000) "SYSTEM AND CAMERA FOR TRANSFERRING DIGITAL IMAGES TO A SERVICE PROVIDER" filed by Endsley, et. al., the disclosure of which is herein incorporated by reference. Each transfer through the telecommunications network 25 can generate a transfer fee to be charged to the user through service provider 80. Furthermore, service provider 80 can process the high resolution image media file from the cellular wireless electronic camera 23 with respect to content identifiers associated with the user as previously discussed with respect to FIGS. 1, 10a and 10b. Upon matching image content of the transmitted high resolution media file with the users content identifiers, service provider 80 can send a return message to the cellular wireless camera 23 prompting the user to verify the content identified by service provider 80. The verification prompt message can be displayed on the color LCD image display 332 and the user operating push buttons 372–376 shown in FIG. 19 can respond to validate or invalidate the identified content. Such validation is advantageous while the user has just captured the image and his memory of the image content is still fresh.

Another example in which image media files associated with the user can be provided to service provider 80 for transfer to the user computer 10 is a kiosk 15 such as the Kodak Picture Maker™ kiosk that includes a scanner for producing a high resolution image media file of a hardcopy print. Connected to the communications network 50, the kiosk 15 can, for a fee, provide high resolution image media files to service provider 80 that are eventually transferred to the user computer 10.

Figure 16:
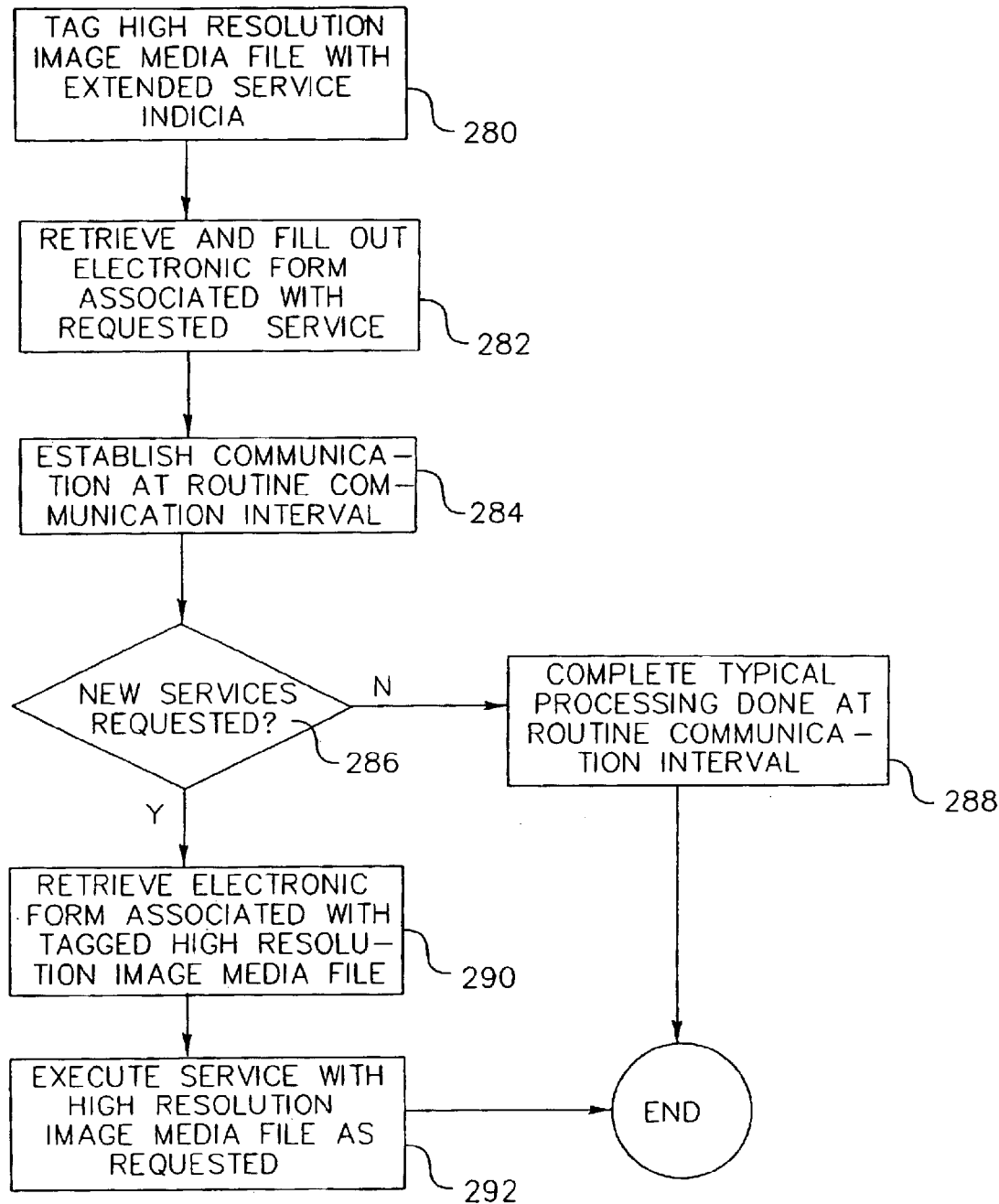
FIG. 16 is a flow chart illustrating another method of operation of the systems of FIGS. 1, 5 and 15.

In FIG. 16, a process for operating the systems 18, 200 and 300 is shown which permits the user to request an extended service in association with a particular high resolution image media file. Beginning in step 280, the user electronically tags (identifies) a high resolution image media file with an extended service indicia. The extended service indicia causes software running on the user computer 10 to retrieve an electronic form (See FIG. 17) that is associated with the requested extended service. The electronic form can be stored on the user computer 10 as part of a service agreement with service provider 80 or it can be actively retrieved from the service provider 80. In either case, the electronic form is retrieved and filled out (step 282) by the user. Upon establishing communication (step 284) either immediately or at the routine communication interval, service provider 80 determines (step 286) if any extended services have been requested. If not, service provider 80 completes the typical processing done at the routine communication interval (step 288) as has been previously discussed ending the process in step 294. If extended services have been requested, service provider 80 uploads (step 290) the completed electronic form associated with the high resolution image media file. Following this step, service provider 80 executes (step 292) the extended service request as indicated by the instructions on the electronic form shown in FIG. 17, with the process ending in step 294.

Figure 17:
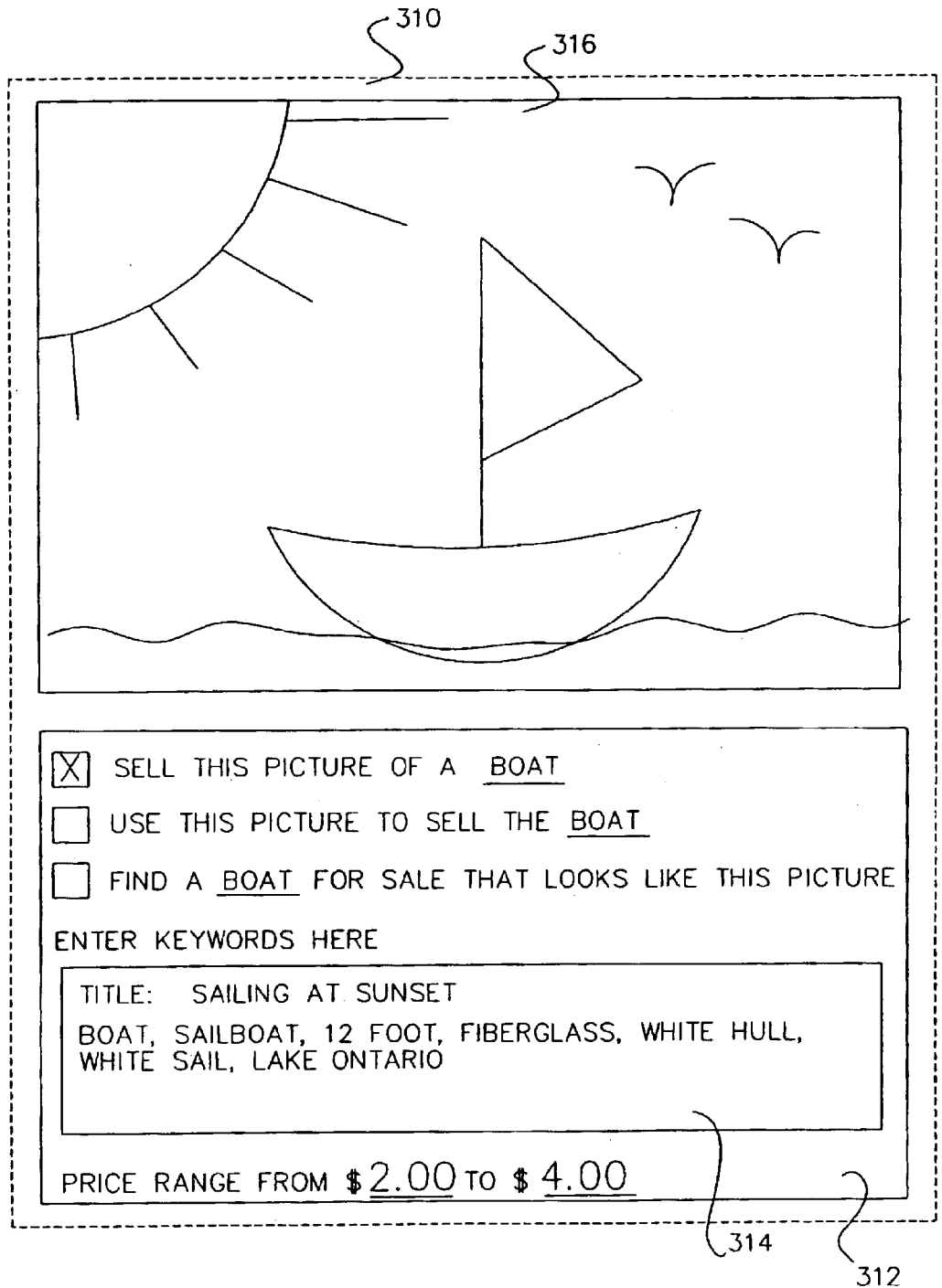
FIG. 17 is a screen shot of a display screen showing an image and an electronic instruction/order form.

Turning now to FIG. 17, a screen shot 310 of user computer 10 is shown that includes a visual representation 316 of a high resolution image media file to which an extended service request form is attached. An instruction block 312, contains information for the service provider 80 to follow in the execution of the requested extended service. In this example, the user has indicated that the high resolution image media file is to be placed for sale which can be one type of extended service offered by service provider 80. The italicized word "BOAT" can be the result of the user selecting a word from a list or it can be the result of applying the user's content identifiers to this specific high resolution image media file. Information block 314 includes keywords that can be input by the user and useful in the execution of the requested extended service. Other extended services include posting the visual representation 316 of the high resolution image media file to a website that uses such visual representations 316 to aid in the selling of goods or to aid in the finding of a seller of such goods.

Another example of an extended service is the use of the high resolution image media file to represent an item insured by a third party such as an insurance business. In the event that an insurance business has been contracted with by the user to insure specific household belongings, high resolution image media files help the user get insurance rates that reflect the actual belongings depicted in the high resolution image media file. The user provides specific information about the specific household belonging depicted by the high resolution image media file such as manufacturer, purchase price, purchase date, serial number and any other information necessary to providing insurance on such a belonging. Additionally, the user provides authorization to service provider 80 for the third party insurance business to view specific high resolution image media files. Tagging a high resolution image media file for adding to an insured item list or deleting from an insured item list permits an automatic update of insurance coverage and can result in an added fee or credit applied to the user by the third party insurance business. Service provider 80 can charge a fee from a third party business for permitting the third party business such as an insurance business to view image media files depicting household objects belonging to the user. An additional third party, such as the retailer of the item sold, can be used for validation of ownership and sale of the particular item.

Figure 18:
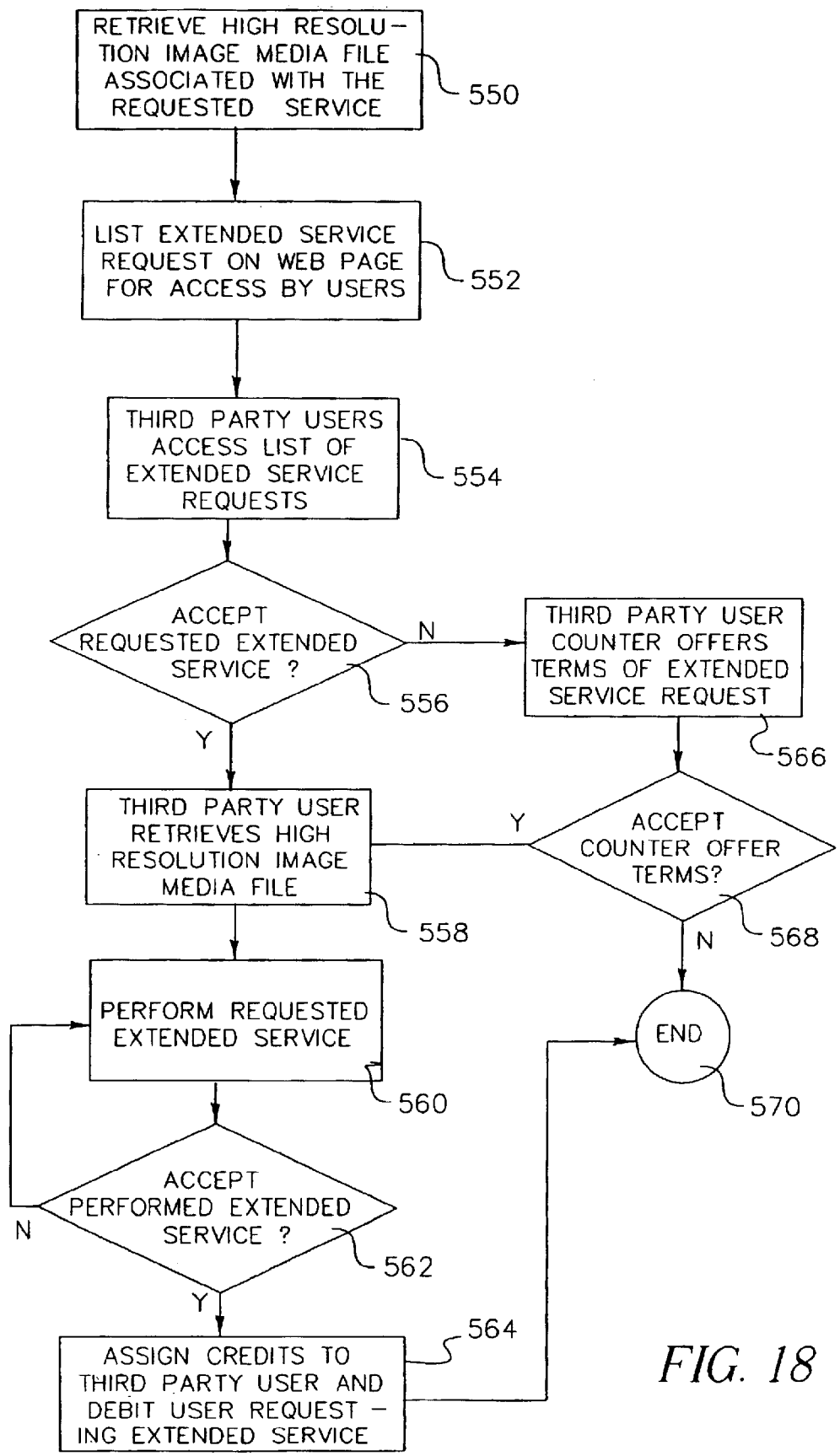
FIG. 18 is a flow chart illustrating another method of operation of the systems of FIGS. 1, 5 and 15.

Another example of extended services includes a service performed by a non-professional third party user or peer (a free lance individual) operable in the systems 18, 200 and 300 by the processes shown in FIGS. 16 and 18. The process of FIG. 18 describes an example of a detailed process used by service provider 80 in step 292 of FIG. 16. In this case, the user has provided unlimited third party authorized access to a high resolution image media file or group of high resolution image media files on the extended service request form for the purposes of restoring a scanned high resolution image file created from an older, damaged hardcopy print. Information on the extended service request form can include an amount of money that requesting user is willing to pay in exchange for the service. In lieu of money, account manager 84 can provide account credits to the third party providing the service. These account credits can be used when the third party requests extended services from other users. Account manager 84 can also provide account credits in the form of loyalty points or reduced account fees.

Beginning with step 550, service provider 80 retrieves the high resolution image media file from the user computer 10 and stores the high resolution image media file in a memory of computer system 86. While this is the preferred embodiment, the retrieval of the high resolution image media file from user computer 10 need not happen until after third party user accepts the service request in step 558. Following in step 552, service provider 80 adds the extended service request form including a low resolution image file to a list of service requests on a web page whose access and display is managed by web server 82 and account manager 84. Third party users access (step 554) the list of extended service request and decide to accept or not accept an extended service request in step 556. Third party users can counter offer (step 566) to perform the extended service for terms differing from what was originally offered. For example, the third party user can raise the required amount of money from that originally offered to complete the service. The user requesting the service can choose to accept (step 568) the revised terms of service or end the negotiation in step 570. If terms agreed upon, the third party user retrieves (step 558) the high resolution image file to perform the service on from either service provider 80 or directly from the requesting user by accessing the high resolution image media file on user computer 10.

The third party user performs (step 560) the extended service requested, which in this example is an image restoration, by using commonly available tools such as Photoshop™ produced by Adobe Systems Inc. The third party modified high resolution image media file is converted to a low resolution image file for review by the user requesting the extended service. If the user requesting the extended service accepts (step 562) the work of the third party user, service provider 80 assigns (step 564) credits to the third party user less a fee for brokering the service and debits to the user requesting the extended service with the process ending in step 570. Cataloging images is another extended service that can be provided by third party users or peers in this manner.

Figure 19:
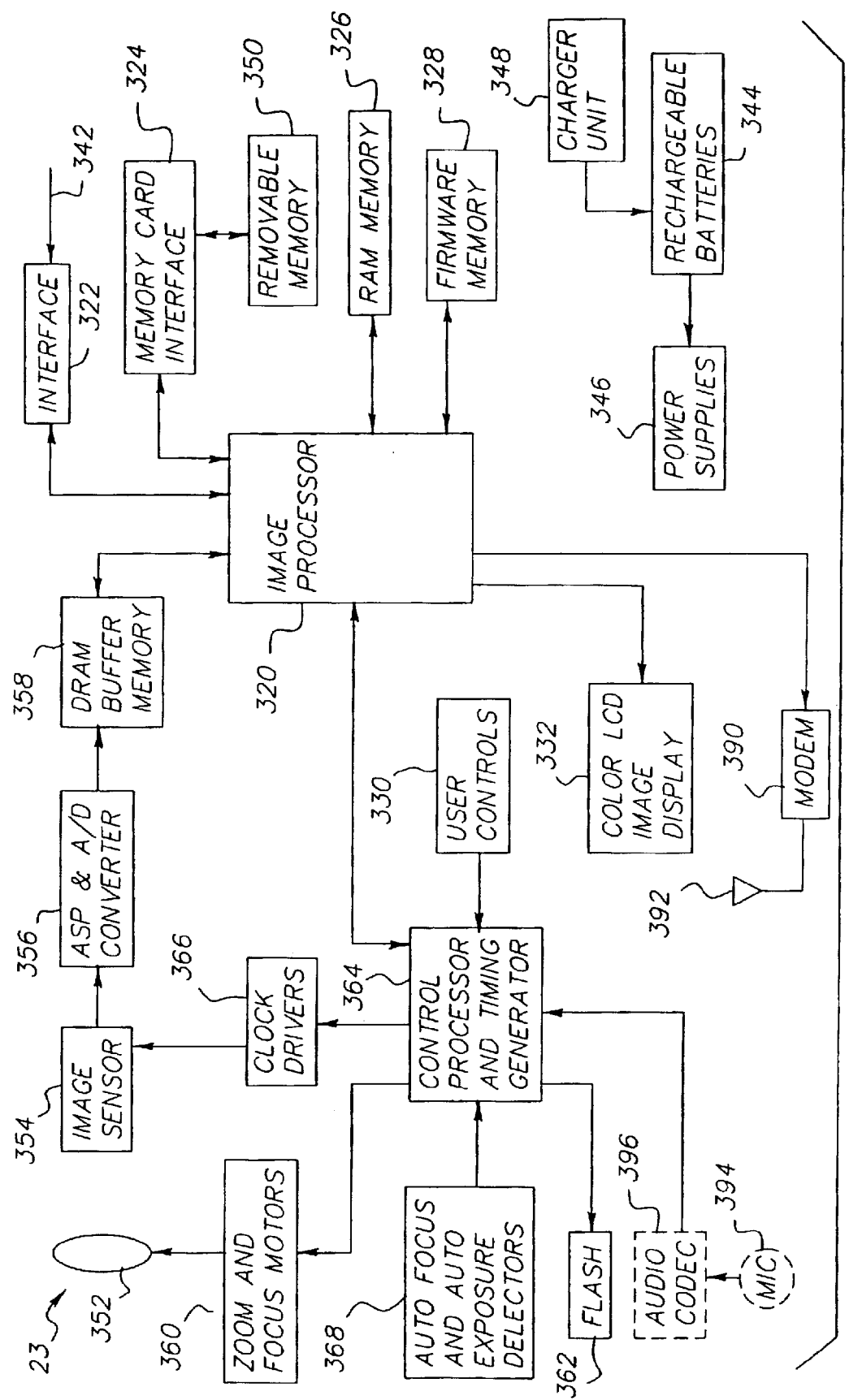
FIG. 19 is a block diagram of an electronic camera 23.
Figure 20:
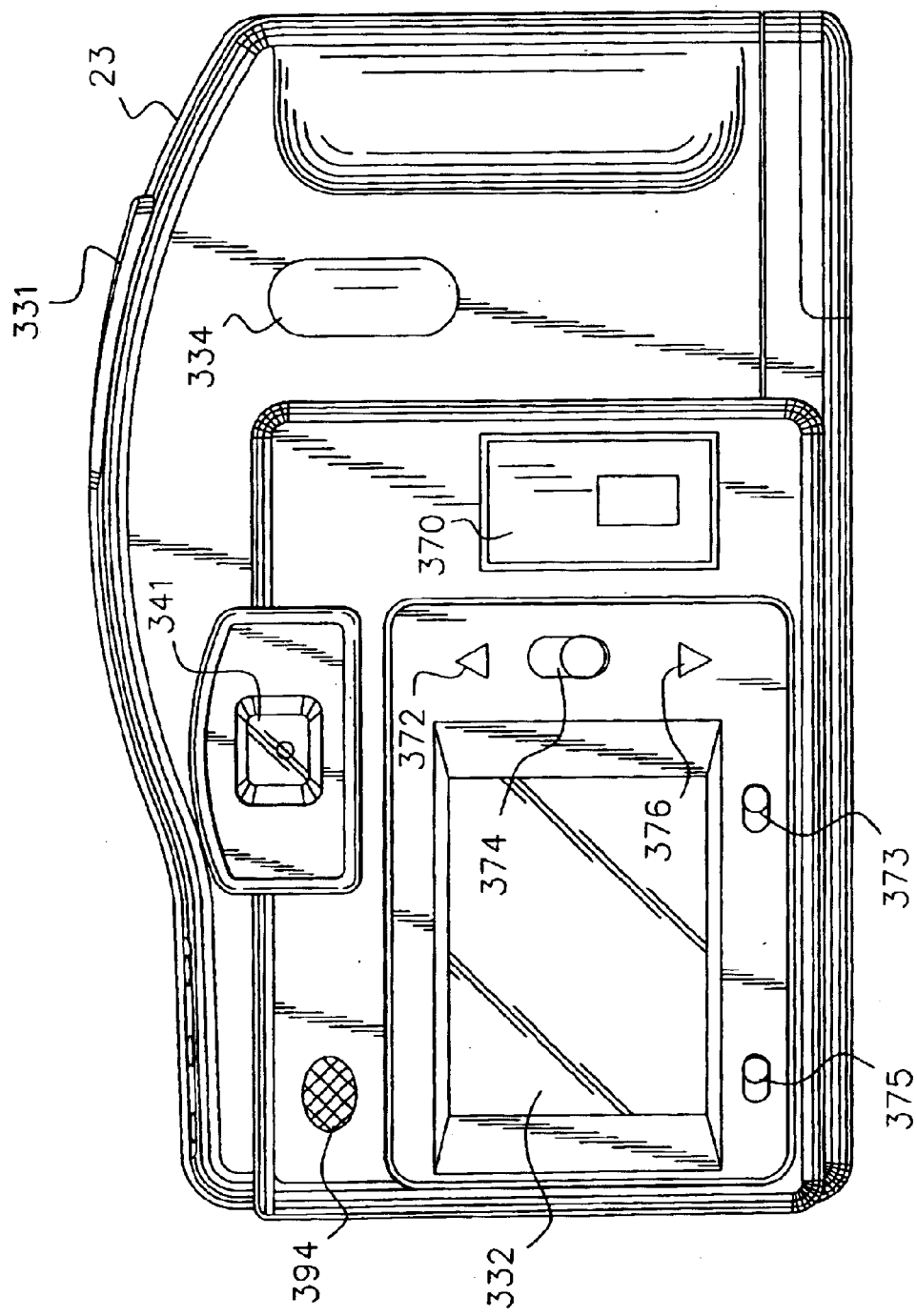
FIG. 20 depicts a rear view of the electronic camera incorporating the features of FIG. 19.

Turning now to FIG. 19, a block diagram of an electronic (digital) camera 23 which captures high resolution image files that are stored on the removable memory card 350. FIG. 20 depicts a rear view of the electronic camera 23 of FIG. 19. The electronic camera 23 is powered by rechargeable batteries 344 that connect to power supply 346 which supplies power to the camera circuits depicted in FIG. 19. A charger input 348 is provided as an external connection (which can be included as part of interface connection 342) so that the rechargeable batteries 344 can be recharged by an external power source. The electronic camera 23 includes a zoom lens 352 having zoom and focus motor drives 360 and an adjustable aperture and shutter (not shown). The user composes the image using the optical viewfinder 341 and the zoom lens control 334 and then depresses the shutter button 331 to begin capture of a still image. The zoom lens 352 focuses light from a scene (not shown) on an image sensor 354, for example, a single-chip color CCD image sensor, using the well-known Bayer color filter pattern. The image sensor 354 is controlled by clock drivers 366. The zoom and focus motors 360 and the clock drivers 366 are controlled by control signals supplied by a control processor and timing generator circuit 364. The control processor and timing generator circuit 364 receives inputs from autofocus and auto-exposure detectors 368 and controls a flash 362. The analog output signal from the image sensor 354 is amplified and converted to digital data by the analog signal processing (ASP) and analog-to-digital (A/D) converter circuit 356. The digital data is stored in a Dynamic Random Access Memory (DRAM) buffer memory 358 and subsequently processed by a processor 320 controlled by the firmware stored in the firmware memory 328, which can be flash Erasable Programmable Read Only Memory (EPROM).

The processed high resolution image file is provided to a memory card interface 324 which stores the high resolution image file on the removable memory card 350. Removable memory cards 350 are one type of removable image digital storage medium and are available in several different physical formats. For example, the removable memory card 350 can include memory cards adapted to the Personal Computer Memory Card International Association (PCMCIA) card interface standard, as described in the PC Card Standard, Release 2.0, published by the Personal Computer Memory Card International Association, Sunnyvale, Calif., September 1991. The removable memory card 350 can also be adapted to the Compact Flash interface standard, such as described in the CompactFlash Specification Version 1.3, published by the CompactFlash Association, Palo Alto, Calif., Aug. 5, 1998, or to the well-known SmartMedia, MemoryStick or SD memory card formats. Other types of removable image digital storage media, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 350. The JPEG file uses the so-called "Exif" image format defined in "Digital Still Camera Image File Format (Exit)" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings and image captions or comments that can be selected or entered by the camera user.

The electronic camera 23 also includes a modem 390 connected to an RF antenna 392. The modem 390 is preferably a cellular modem using, for example CDMA (Code Division Multiple Access) or TDMA (Time Division Multiple Access) technologies. The modem 390 communicates with communication network 50 via a wide area cellular network, such as the 1900 MHz CDMA network deployed by Sprint PCS in the USA.

An interface connection 342 can be used to connect between an interface 322 in the electronic camera 23 and a corresponding camera interface in the user computer 10. The interface connection 342 may conform to, for example, the well-known universal serial bus (USB) interface specification, or to many other standard interfaces. The interface connection 342 can be used to transfer images from removable memory card 350 to the user computer 10. The interface connection 342 can also be used to transfer data from the user computer 10 to firmware memory 328 in electronic camera 23. In particular, it can optionally be used to transfer phone numbers, e-mail addresses, Internet URLs, etc. to firmware memory 328, as described in commonly-assigned U.S. Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference.

The graphical user interface displayed on the color LCD image display 332 is controlled by mode control 370 and push buttons 372–376 shown in FIG. 19. The user places the mode control 370 in the "capture" position prior to capturing images. The user places the mode control 370 in the "review" position in order to review the captured images, delete undesirable images and transfer images via modem 390, using push buttons 372–376. An optional microphone 394, connected control processor and timing generator circuit 364 via audio codec 396, can be used to receive voice commands, as described in described in commonly-assigned U.S. Pat. No. 5,737,491 entitled "ELECTRONIC IMAGING SYSTEM CAPABLE OF IMAGE CAPTURE, LOCAL WIRELESS TRANSMISSION AND VOICE RECOGNITION" to Allen, et. al., the disclosure of which is herein incorporated by reference.

Figure 21:
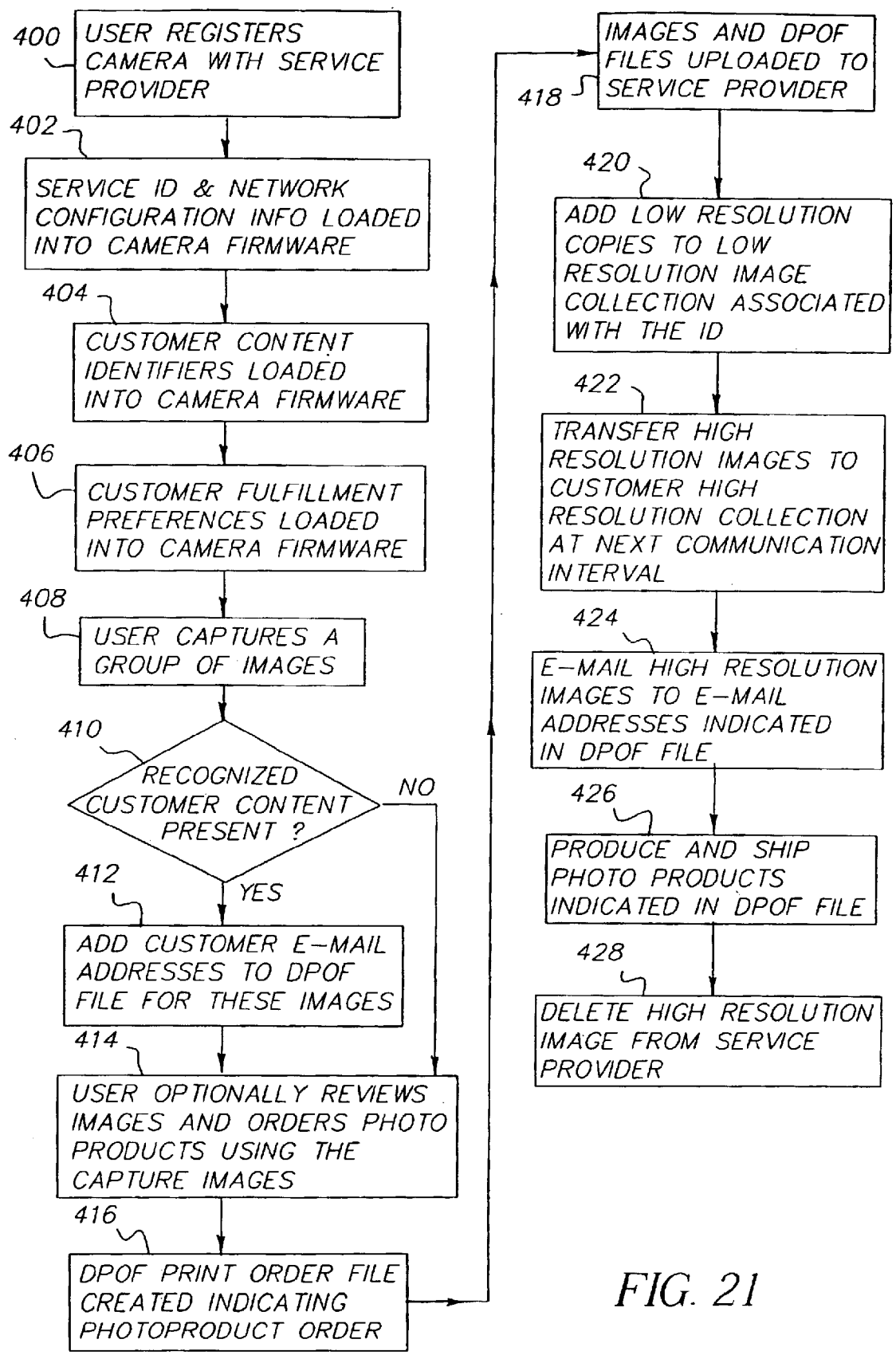
FIG. 21 is a flow chart of a method of using the electronic camera of FIG. 20.

FIG. 21 depicts a flow chart of a method of using the electronic camera 23 in order to transfer high resolution image files captured by the electronic camera 23 to a user's high resolution image collection, automatically email images to one or more people depicted in the captured images and order copies of high resolution image files from fulfillment provider 70. In step 400, the user registers their electronic camera 23 with the service provider 80 and provides information such as was described earlier in relation to step 30 of FIG. 2. In step 402, the service provider 80 provides a service ID and network configuration information which is stored in the firmware memory 328 of electronic camera 23. This can be done when the electronic camera 23 is purchased or rented from the service provider 80, as described in commonly-assigned U.S. patent application Ser. No. 09/574,985 entitled "SYSTEM AND METHOD FOR PROVIDING IMAGING PRODUCTS AND SERVICES" to Wolcott, et. al., the disclosure of which is herein incorporated by reference. This enables the electronic camera 23 to automatically connect to the communications network 50 via modem 390 in order to transfer high resolution image files and control information to the service provider 80.

In step 404, the user content identifiers described earlier in relation to FIGS. 9–10 are stored in the firmware memory 328 of electronic camera 23. This enables the electronic camera 23 to recognize user content present in any captured high resolution image files. In step 406, the user fulfillment preferences are stored in firmware memory 328 of electronic camera 23. These preferences may stored using a service account information file as described in commonly-assigned U.S. patent application Ser. No. 09/576,288 entitled "METHOD FOR PROVIDING CUSTOMIZED PHOTO PRODUCTS OVER A NETWORK" to Parulski, the disclosure of which is herein incorporated by reference. This service account information file can be created when the user purchases or rents the electronic camera 23, in response to user selections of preferred photo products, such as service prints, album pages and the like, that the user is likely to purchase from the fulfillment provider 70.

Following step 406, the electronic camera 23 is ready to capture high resolution images. In step 408, the user captures a group of high resolution images using the electronic camera 23. The high resolution images are processed as described earlier and temporarily stored on memory card 350. In step 410, the captured high resolution images are optionally examined to determine if one or more are recognized as including user content, using the user content identifiers provided in step 404. Each user content identifier includes at least one e-mail address. In step 412, for each image which has been recognized as having user content (e.g. each image including the face of the person corresponding to image icon 202 in FIG. 10) the images are marked for automatic transfer to the e-mail address(s) corresponding to the recognized image icon 202. This image marking can be implemented, for example, by creating a Digital Print Order Format (DPOF) version 1.1 "auto transfer" file which includes the e-mail address and the file names of the images which have been recognized as including the image icon 202. This auto transfer file is preferably an ASCII text file named AUTXFER.MRK, in accordance with the DPOF specification.

In step 414, the user optionally reviews the captured high resolution images and orders photo products, such as enlargements and album pages, using the captured high resolution image files. The switches 372–376 are used to select high resolution image files to be printed to produce these photo products and the number of copies to be made. In step 416, the electronic camera 23 creates an image utilization file, as described in commonly-assigned U.S. Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference. This image utilization file is preferably an ASCII text file named AUTOPRNT.MRK, in accordance with the Digital Print Order Format (DPOF) specification.

In step 418, the captured high resolution image files and the optional DPOF auto transfer and print order files are transmitted to the service provider 80 via modem 390 and are temporarily stored at the service provider 80. The transmission begins when the electronic camera 23 provides an ID that identifies the user account and the instructions provided by the user during the registration process. These instructions normally include the address of the user's high resolution collection. The instructions can also include default photo product requests, that can be used instead of, or in addition to, the DPOF print order file. For example, the instructions can specify that one 4×6 inch print (10.16 cm×15.24 cm) of each uploaded image should be produced and mailed to a user specified address. In this case, the DPOF print order file is used only when the user wishes to override this "default" instruction.

In step 420, low resolution copies of each uploaded high resolution image file are added to the low resolution image collection associated with the ID provided by the electronic camera 23. These low resolution copies are normally stored at the service provider 80 so that they can be accessed by authorized third parties as described earlier in relation to step 44 of FIG. 1.

In step 422, the high resolution image files are transferred from the service provider 80 to the user's high resolution image collection (normally located on the user computer 10) as described earlier in step 120 of FIG. 6. This transfer can occur during the next routine communication interval, or during a non-scheduled communication.

In step 424, the high resolution image files are e-mailed to the email addresses provided in the DPOF AUTXFER. MRK file described earlier in relation to step 412.

In step 426, the high resolution image files are transferred from the service provider 80 to the fulfillment provider 70, where they are used to produce the default photo products defined in the instructions provided by the user in step 400, or in the DPOF AUTPRINT.MRK file described earlier in relation to step 416.

After the high resolution image files have been transferred, they no longer need to be stored by the service provider 80. Alternatively, service provider 80 can store the high resolution image files for a fixed period of time such as 90 days to facilitate product reordering. After such a fixed period, the high resolution image files are converted to low resolution image files and added to the user's low resolution collection as previously discussed.

Figure 22:
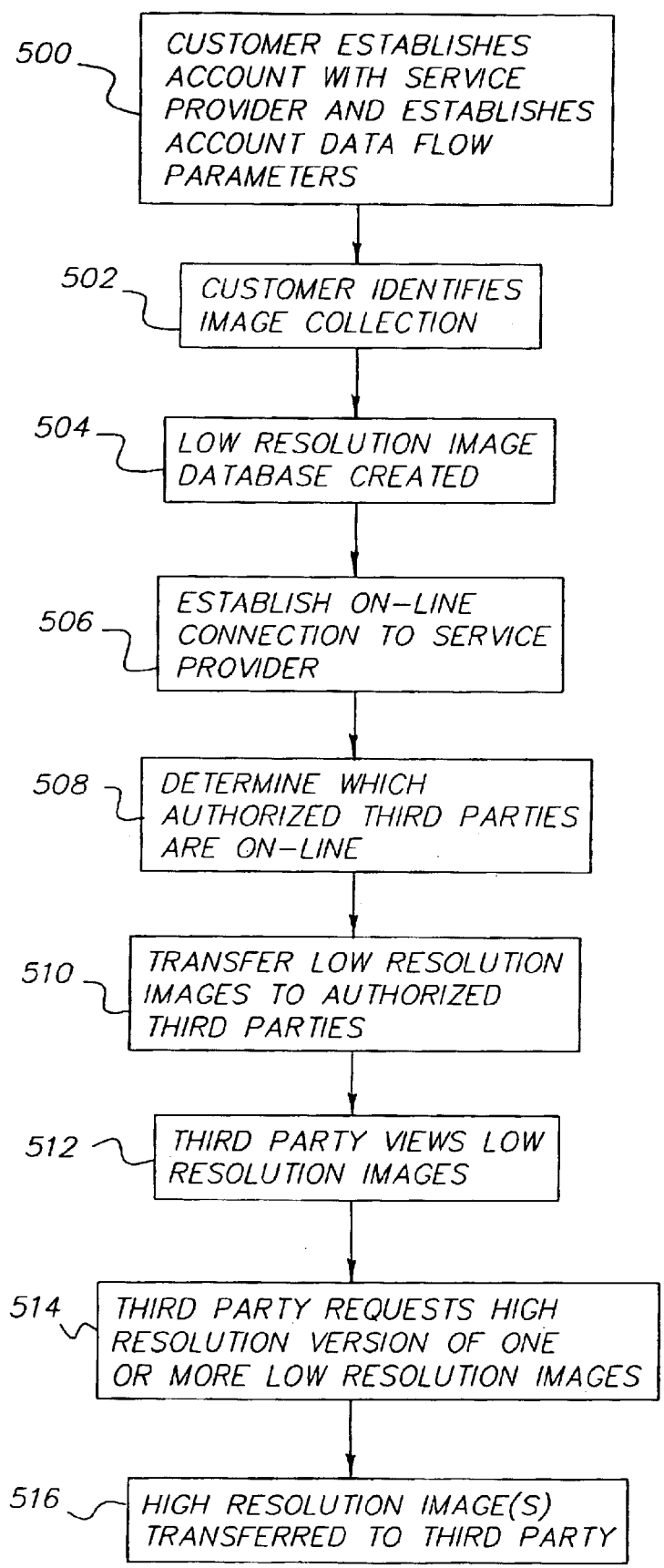
FIG. 22 shows a flow chart that illustrates another method of operation of the system of FIG. 1.

Turning now to FIG. 22, there is shown a flow chart which shows another method of operation of the system of FIG. 1. In this embodiment, the low resolution images are maintained on user computer 10, rather than being provided by the service provider 80. In step 500, the user establishes an account with the service provider 80 and establishes account data flow parameters, as described earlier in reference to step 30 of FIG. 2. In step 502, the user identifies an image collection, as described earlier in reference to step 32 of FIG. 2.

In step 504, a low resolution image database is created on the user computer 10, so that low resolution images can be provided to authorized third parties. In step 506, an on-line connection is established using CSP 20 and communication network 50, between the user's home computer 10 and the service provider 80, to indicate that the user is now on-line. In step 508, the service provider 80 determines which, if any, authorized third parties are currently on-line and wish to view the images in the low resolution image collection of the user. In step 510, the low resolution images are transferred from the user computer 10 to the computer 16 of the authorized third party using CSP 20, communication network 50 and CSP 22. In step 512, the third party views the low resolution images transferred from the user computer 10 on the third party computer 16. In step 514, the third party requests the high resolution version of one or more low resolution images transferred from the user computer 10. In step 516, the high resolution images are transferred from the user computer 10 to the third party computer 16.

Figure 23:
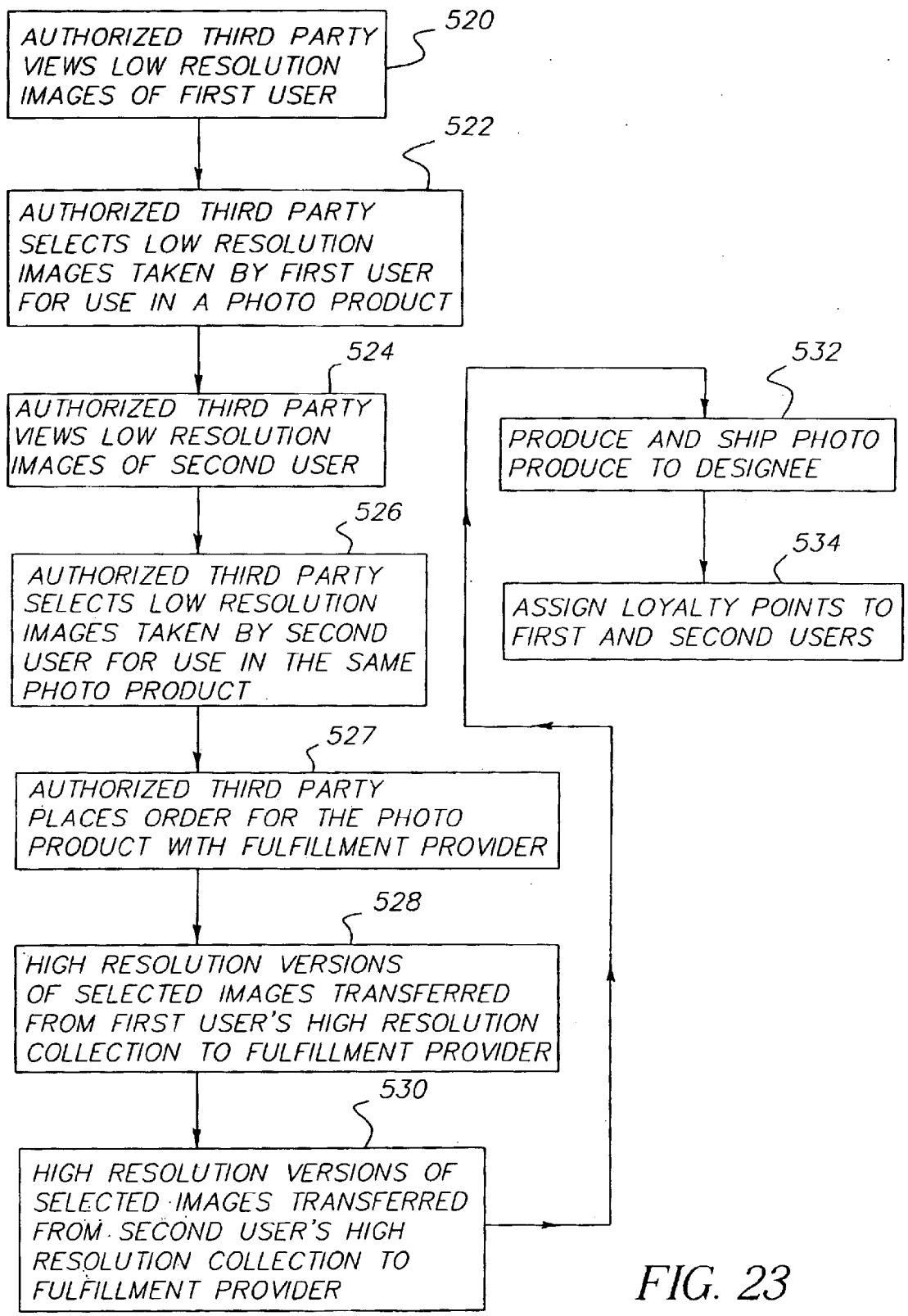
FIG. 23 illustrates a flow chart which shows another method of operation of the system of FIG. 1

Turning now to FIG. 23, there is shown a flow chart which shows another method of operation of the system 18 of FIG. 1 or the system 200 of FIG. 5. In step 520, an authorized third party views the low resolution images of a first user. These low resolution images may be provided by the service provider 80, as described in relation to FIG. 2 and FIG. 6, or may be provided from the first user computer 10, as described in relation to FIG. 21. In step 522, the authorized third party selects one or more low resolution images from the first user's collection, for inclusion in a photo product, such as a photo album or a photo montage, containing numerous pictures. Such pictures might, for example, be of the same event attended by the first user, a second user and an authorized third party.

In step 524, the authorized third party views the low resolution images of the second user. Again, these low resolution images may be provided by the service provider 80, as described in relation to FIG. 2 and FIG. 6, or may be provided from the second user's computer, as described in relation to FIG. 21.

In step 527, the authorized third party places an order with the fulfillment provider 70, via service provider 80, for the photo product, which includes the selected images from the first user's collection and the second user's collection. In step 528, high resolution versions of the images selected by the authorized third party are transferred from the first user's high resolution collection to the fulfillment provider 70. This may occur immediately if the first user is currently on-line, or at a later time at the next routine communication interval. In step 530, high resolution versions of the images selected by the authorized third party are transferred from the second user's high resolution collection to the fulfillment provider 70. In step 532, the fulfillment provider 70 produces and ships the photo product selected by the authorized third party to the designated address provided by the authorized third party and bills the authorized third party for the photo product. In step 534, loyalty points are assigned to the first and second users, for providing the digital images which were used in the photo product.

The invention has been described in detail with particular reference to certain preferred embodiments thereof, but it will be understood that variations and modifications can be effected within the spirit and scope of the invention.

PARTS LIST

10 User computer
12 Electronic camera
14 Storage drive
15 Kiosk
16 Third party computer
18 System
20 Communication service provider (CSP)
22 Communication service provider (CSP)
23 Digital Camera
25 Telecommunications network
30 Step
32 Step
34 Step
36 Step
38 Step
40 Step
42 Step
44 Step
46 Step
50 Communication network
52 Step 54 Step
56 Step
58 Step
68 Transportation vehicle
70 Fulfillment Provider
72 Web server
74 Commerce manager
75 Fulfillment manager
76 Computer system
78 Digital printer
80 Service provider
82 Server
84 Account manager
86 Computer system
88 Regional database(s)
90 Photofinisher
92 Photographic film
93 Film cartridge
94 Film processor
96 Film scanner
98 Memory device
100 Computer
102 Server
104 Printer
106 Step
108 Step
110 Unique identification (ID)
112 Step
114 Step
116 Step
118 Step
120 Step
122 Step
124 Step
126 Step
128 Step
130 Step
132 Step
134 Step
136 Step
138 Step
140 Step
142 Step
144 Step
148 Step
149 Step
150 Step
152 Step
154 Step
156 Step
158 Step
160 Step
162 Step
166 Step
170 Step
172 Step
174 Step
176 Step
178 Step
180 Step
182 Step
184 Step
200 System
202 Image icon
204 Display screen
206 Image
228 Step
230 Step
232 Step
234 Step
236 Step
238 Step
240 Step
242 Step
244 Step
250 Step
252 Step
254 Step
256 Step
260 Step
262 Step
264 Step
266 Step
268 Step
270 Step
272 Step
274 Step
276 Step
280 Step
282 Step
284 Step
286 Step
288 Step
290 Step
292 Step
294 Step
300 System
310 Screen shot
312 Instruction block
314 Information block
316 Visual representation
320 Processor
322 Interface
324 Memory card interface
328 Firmware memory
331 Shutter button
332 LCD image display
334 Zoom lens control
341 Optical viewfinder
342 Interface connection
344 Rechargeable batteries
346 Power supply
348 Charger unit
350 Removable memory card
352 Zoom lens
354 Image sensor
356 Circuit
358 Buffer memory
360 Focus motors
362 Flash
364 Timing generator circuit
366 Clock drivers
368 Auto-exposure detectors
370 Mode control
372 Push buttons/switches
373 Push buttons/switches
374 Push buttons/switches
375 Push buttons/switches
376 Push buttons/switches
390 Modem
392 RF antenna
394 Microphone
396 Audio codec
400 Step 402 Step
404 Step
406 Step
408 Step
410 Step
412 Step
414 Step
416 Step
418 Step
420 Step
422 Step
424 Step
426 Step
428 Step
500 Step
502 Step
504 Step
506 Step
508 Step
510 Step
512 Step
514 Step
516 Step
520 Step
522 Step
524 Step
526 Step
527 Step
528 Step
530 Step
532 Step
534 Step
550 Step
552 Step
554 Step
556 Step
558 Step
560 Step
562 Step
564 Step
566 Step
568 Step
570 Step

What is claimed is:

1. A method for providing assistance in recreating a digital image file on a user computer from information obtained over a communication network retained at a remote location with respect to said image file, comprising:

analyzing a user storage device in a user computer over said communication network so as to obtain low resolution digital image files of high resolution digital image files stored on said storage device and storage parameters of the high resolutions digital image files;

storing said low resolution digital image files and said storage parameters at a remote server of a provider; and transmitting from said remote location of said remote serve of a provider said image storage parameters over said communication network to said user computer so as to assist in reconstructing the high resolution digital image files in said user storage device that has had some loss of data.

2. The method according to claim 1 wherein said storage parameters comprises data structure information of said high resolution digital image files.

3. A method according to claim 1 wherein said storage parameters are updated at routine communication intervals.

4. A system for providing assistance in recreating a digital image file on a user computer from information obtained over a communication network retained at a remote location with respect to said image file, comprising:

a provider having a provider computer that analyzes a user storage device in said user computer over said communication network so as to obtain low resolution digital image files of high resolution digital image files stored on said storage device and storage parameters of the high resolutions digital image files; said provider storing said storage parameters at a remote server of a provider; and said provider transmitting from said remote location said image storage parameters over said communication network to said user computer so as to assist in reconstructing the high resolution digital image files in said user storage device that has had some loss of data.

5. The system according to claim 1 wherein said storage parameters comprises data structure information of said high resolution digital image files.

6. A method according to claim 4 wherein said storage parameters are updated at routine communication intervals.

* * * * *